United States Patent
Kim et al.

(10) Patent No.: US 9,860,824 B2
(45) Date of Patent: Jan. 2, 2018

(54) METHOD AND USER EQUIPMENT FOR BLOCKING NETWORK ACCESS BY ACDC

(71) Applicant: LG ELECTRONICS INC., Seoul (KR)

(72) Inventors: Jaehyun Kim, Seoul (KR); Youngdae Lee, Seoul (KR); Laeyoung Kim, Seoul (KR); Ki-dong Lee, Seoul (KR); Hyunsook Kim, Seoul (KR); Taehun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/113,802

(22) PCT Filed: Nov. 10, 2015

(86) PCT No.: PCT/KR2015/012062
§ 371 (c)(1),
(2) Date: Jul. 22, 2016

(87) PCT Pub. No.: WO2016/076606
PCT Pub. Date: May 19, 2016

(65) Prior Publication Data
US 2017/0041854 A1 Feb. 9, 2017

Related U.S. Application Data

(60) Provisional application No. 62/077,324, filed on Nov. 10, 2014, provisional application No. 62/106,220, (Continued)

(51) Int. Cl.
*H04W 48/06* (2009.01)
*H04W 28/02* (2009.01)
*H04L 12/859* (2013.01)

(52) U.S. Cl.
CPC ......... *H04W 48/06* (2013.01); *H04L 47/2475* (2013.01); *H04W 28/02* (2013.01); *H04W 28/0215* (2013.01)

(58) Field of Classification Search
None
See application file for complete search history.

(56) References Cited

U.S. PATENT DOCUMENTS

| | | | |
|---|---|---|---|
| 2015/0117213 A1* | 4/2015 | Pinheiro | H04W 28/0284 370/235 |
| 2015/0195712 A1* | 7/2015 | Pinheiro | H04W 12/08 455/411 |

(Continued)

FOREIGN PATENT DOCUMENTS

| | | |
|---|---|---|
| WO | 2013141660 A1 | 9/2013 |
| WO | 2013168700 A1 | 11/2013 |
| WO | 2013191447 A1 | 12/2013 |

OTHER PUBLICATIONS

Qualcomm Incorporated et al. "Introduction of ACB skip for MMTEL voice/video and SMS", 3GPP TSG-RAN Meeting #87, R2-143917, Aug. 22, 2014, 6 pages.

(Continued)

*Primary Examiner* — Brian Roberts
(74) *Attorney, Agent, or Firm* — Lee, Hong, Degerman, Kang & Waimey

(57) ABSTRACT

A disclosure of the present specification provides a network access blocking method performed by a user equipment. The method may comprise the steps of: receiving application specific congestion control for data communication (ACDC) blocking information and access class barring (ACB) blocking information; determining the category of an application being executed according to a network access attempt by the application; performing an ACDC blocking check on the basis of the determined category and the received ACDC blocking information. Here, when the network access attempt by the application is not blocked as a result of the ACDC blocking check, an ACB blocking check on the basis of the ACB blocking information may be skipped.

12 Claims, 21 Drawing Sheets

Related U.S. Application Data filed on Jan. 22, 2015, provisional application No. 62/157,433, filed on May 5, 2015, provisional application No. 62/157,987, filed on May 7, 2015, provisional application No. 62/162,839, filed on May 18, 2015, provisional application No. 62/164,575, filed on May 21, 2015.

(56) References Cited

U.S. PATENT DOCUMENTS

| | | | |
|---|---|---|---|
| 2015/0215845 A1* | 7/2015 | Pinheiro | H04W 48/06 455/418 |
| 2015/0271708 A1* | 9/2015 | Zaus | H04W 76/02 370/230 |
| 2015/0289195 A1* | 10/2015 | Gogic | H04W 48/06 370/230 |
| 2016/0183165 A1* | 6/2016 | Zhu | H04W 48/06 370/230 |
| 2016/0212653 A1* | 7/2016 | Wang | A61B 10/0051 |

OTHER PUBLICATIONS

LTE, "Evolved Universal Terrestrial Radio Access (E-UTRA); Radio Resource Control (RRC); Protocol specification (3GPP TS 36.331 version 12.3.0 Release 12)", ETSI TS 136 331 V12.3.0, Sep. 2014, 383 pages.

* cited by examiner

METHOD AND USER EQUIPMENT FOR BLOCKING NETWORK ACCESS BY ACDC

CROSS-REFERENCE TO RELATED APPLICATIONS

This application is the National Stage filing under 35 U.S.C. 371 of International Application No. PCT/KR2015/012062, filed on Nov. 10, 2015, which claims the benefit of U.S. Provisional Application No. 62/077,324, filed on Nov. 10, 2014, 62/106,220, filed on Jan. 22, 2015, 62/157,433, filed on May 5, 2015, 62/157,987, filed on May 7, 2015, 62/162,839, filed on May 18, 2015 and 62/164,575, filed on May 21, 2015, the contents of which are all hereby incorporated by reference herein in their entirety.

BACKGROUND OF THE INVENTION

Field of the Invention

The present invention relates to a technique of barring access for congestion control in a mobile communication system.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |

TABLE 1-continued

| REFERENCE POINT | DESCRIPTION |
|---|---|
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

Meanwhile, when the UE 10 requests the RRC connection for the purpose of data transmission of the user plane, if the network, for example, the base station (that is, eNodeB) is in the congest state, the UE 10 may reject the request for the RRC connection.

In the overload and congest situation of the network, a method for differentiating the service per specific application of the UE is required. However, in the related art, there is no method of implementing the method.

SUMMARY OF THE INVENTION

Accordingly, an object of the present invention is to present a method that can solve the aforementioned problem.

In order to achieve the aforementioned purpose, one disclosure of the present specification provides a method for barring a network access. The method may be performed by a user equipment (UE) and comprise: receiving an application specific congestion control for data communication (ACDC) barring information and an access class barring (ACB) barring information; determining a category of an application being executed, according to a network access caused by the executed application; and performing a ACDC barring check based on the determined category and the received ACDC barring information. Here, if the network access caused by the executed application is not barred according to the ACDC barring check, an ACB barring check to be performed based on the ACB barring information is skipped.

The ACB barring check may be skipped based on an ACB barring check skipping indication. Or, if the ACDC barring check is performed, the ACB barring check may be skipped regardless of an ACB barring check skipping indication The method may further comprise: although a barring timer is running since a previous network access has been barred according to a previous ACB barring check, if a network access by the executed application is not barred according to the ACDC barring check, stopping the barring timer.

Although a previous network access has been barred according a previous ACB barring check, if the network access is caused by the executed application, the category of the executed application may be determined based on an indication indicating that the barred network access results from the ACB barring check.

The category of the executed application may be determined based on information related to an attribute of the application.

The information related to an attribute of the application may include at least one of: a group, a category, a priority, information and an identifier of an application.

The ACDC barring information may include: a barring rate, a barring factor, a barring time, a roaming information, and an access class barring (ACB) skipping configuration, which are defined per a specific unit of an application.

In order to achieve the aforementioned purpose, one disclosure of the present specification provides a user equipment (UE) for barring a network access. The UE may comprise: a transceiver; a processor configured to control the transceiver and configured to perform: receiving an application specific congestion control for data communication (ACDC) barring information and an access class barring (ACB) barring information; determining a category of an application being executed, according to a network access caused by the executed application; and performing a ACDC barring check based on the determined category and the received ACDC barring information. Here, if the network access caused by the executed application is not barred according to the ACDC barring check, an ACB barring check to be performed based on the ACB barring information may be skipped.

According to a disclosure of the present specification, the aforementioned conventional technical problems can be solved. More specifically, an unnecessary service delay between a terminal and a network can be avoided in an application-based service environment of a system. Further, an unnecessary waste of network resources can be prevented.

DESCRIPTION OF EXEMPLARY EMBODIMENTS

Figure 1:
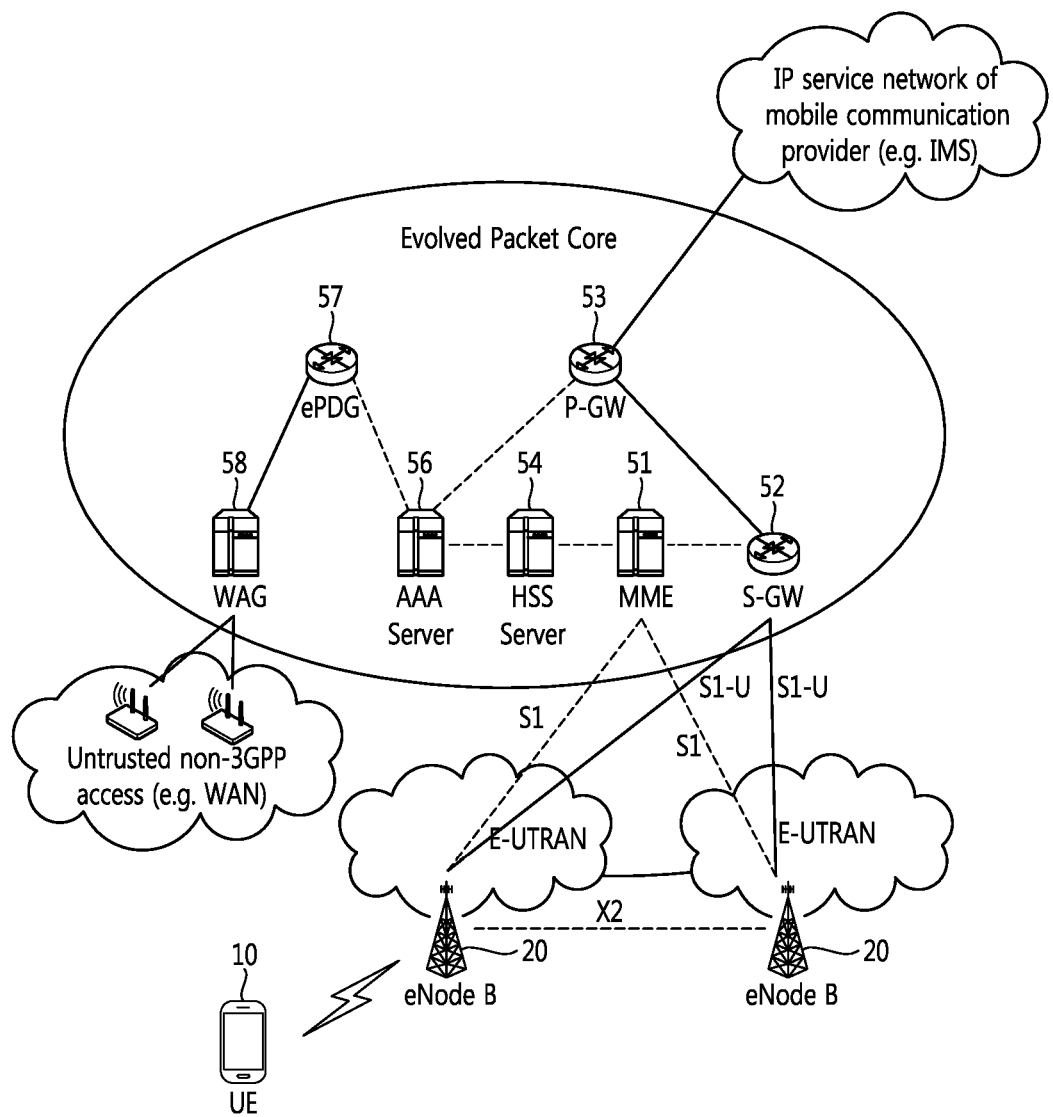
FIG. 1 is a structural diagram of an evolved mobile communication network.
Figure 2:
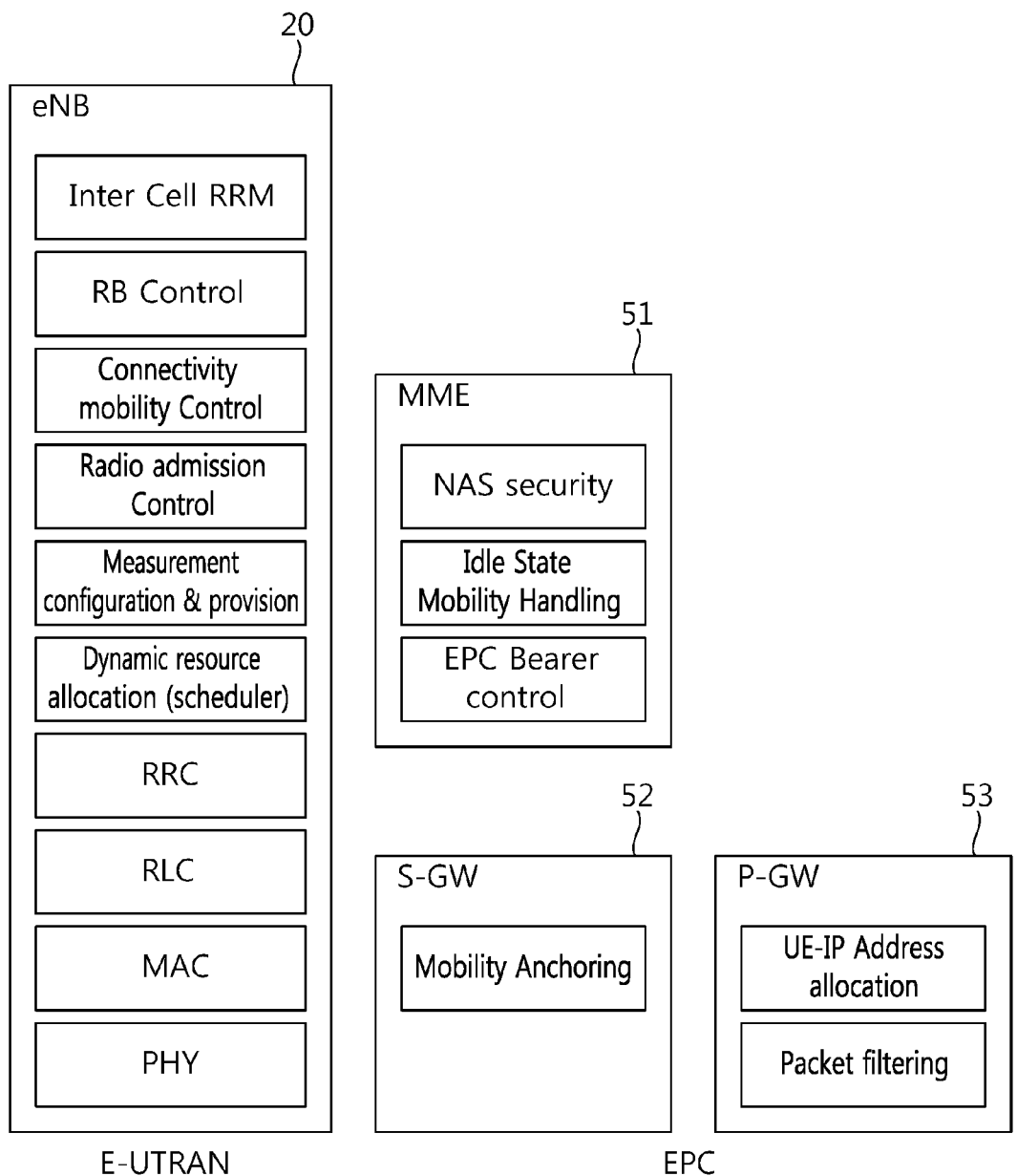
FIG. 2 is an exemplary diagram illustrating architectures of a general E-UTRAN and a general EPC.
Figure 3:
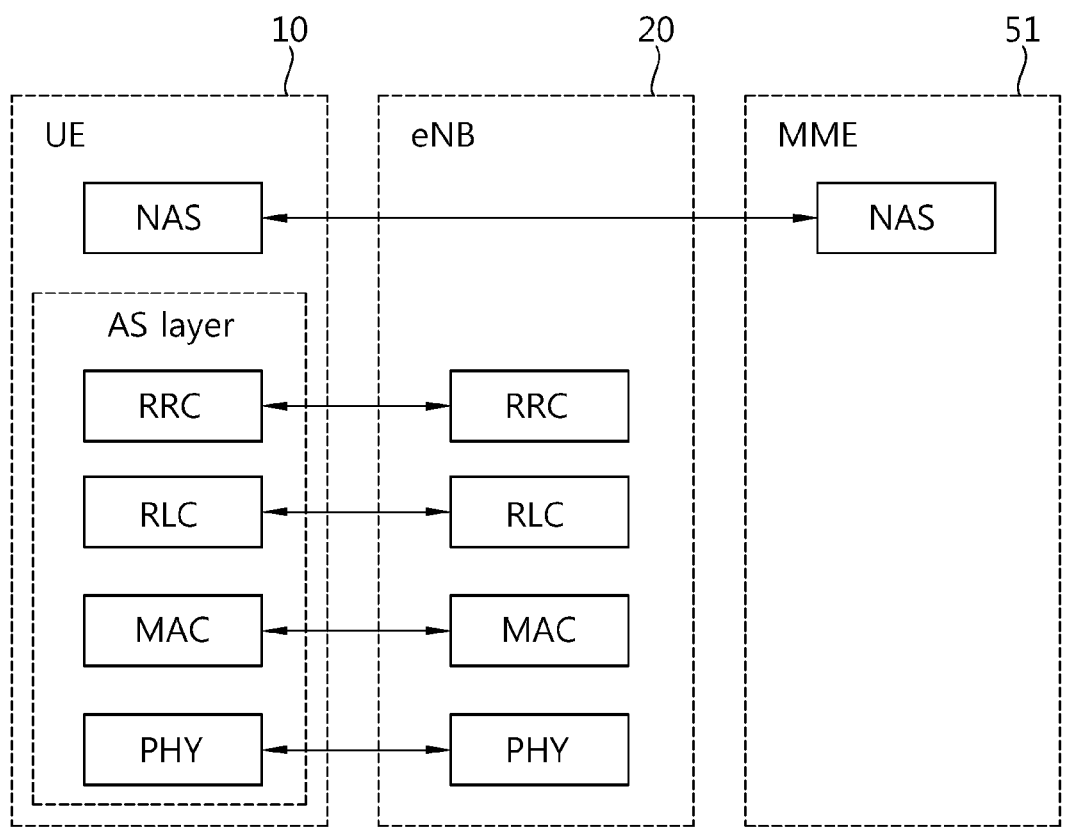
FIG. 3 is an exemplary diagram illustrating a structure of a radio interface protocol on a control plane between UE and eNodeB.
Figure 4:
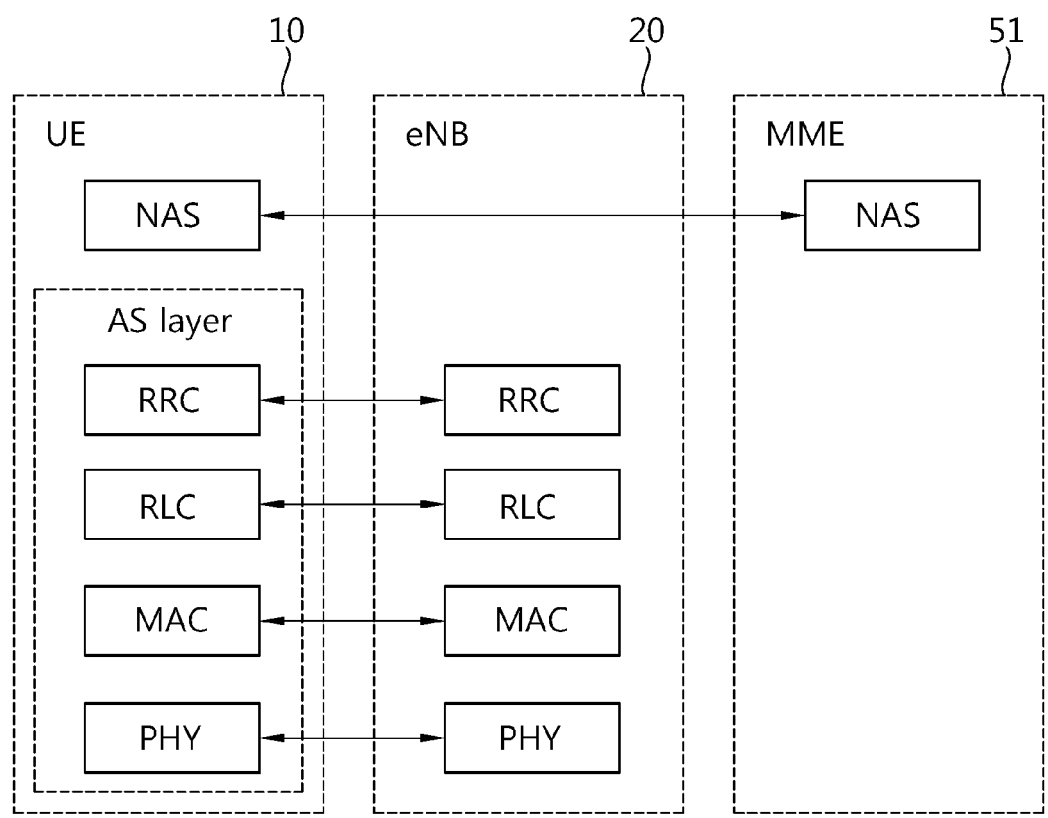
FIG. 4 is another exemplary diagram illustrating a structure of a radio interface protocol on a user plane between the UE and a base station.
Figure 5A:
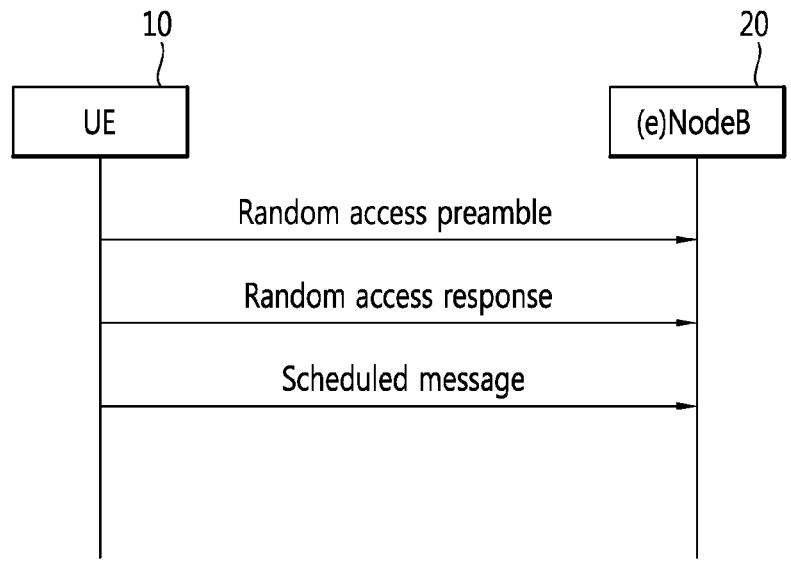
FIG. 5a is a flowchart illustrating a random access process in 3GPP LTE.
Figure 5B:
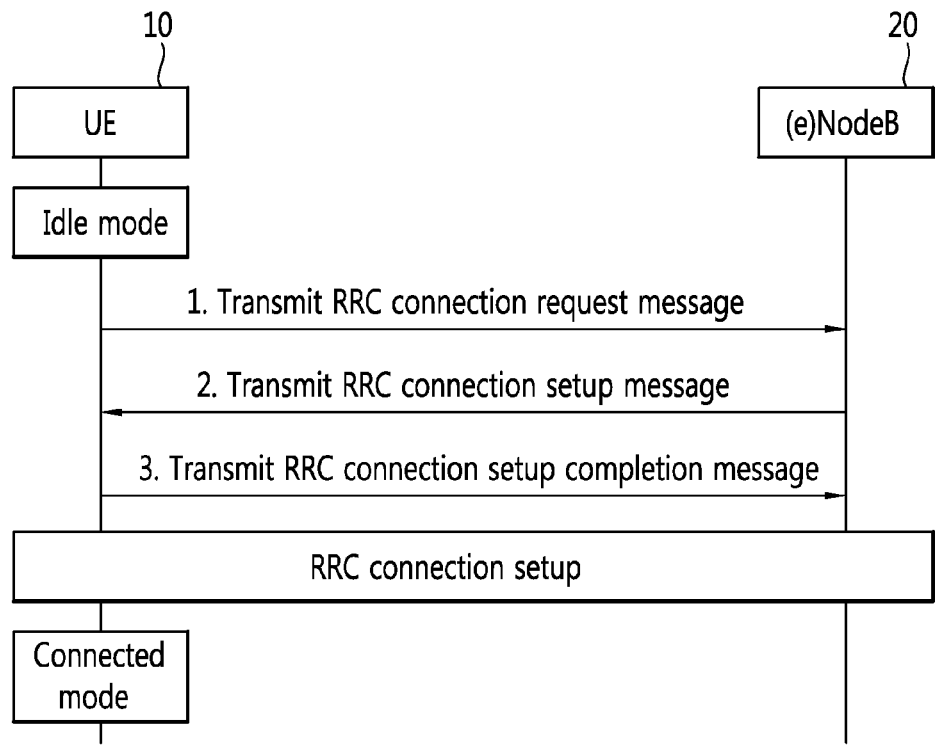
FIG. 5b illustrates a connection process in a radio resource control (RRC) layer.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

DEFINITION OF TERMS

For a better understanding, the terms used herein are briefly defined before going to the detailed description of the invention with reference to the accompanying drawings.

An UMTS is an abbreviation of a Universal Mobile Telecommunication System, and it refers to the core network of the 3rd generation mobile communication.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF): The node of an EPS network which performs a policy decision for dynamically applying QoS and a billing policy that are different for each service flow.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A Tunnel Endpoint Identifier (TEID): The end point ID of a tunnel set between nodes within a network, and it is set for each bearer unit of each UE.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameter associated with NAS functionality NAS (Non-Access-Stratum): A higher stratum of a control plane between a UE and an MME. The NAS supports mobility management, session management, IP address management, etc., between the UE and the network.

MM (Mobility Management) operation/procedure: An operation or procedure for mobility regulation/management/control of the UE. The MM operation/procedure may be interpreted as including one or more of an MM operation/procedure in a CS network, a GMM operation/procedure in a GPRS network, and an EMM operation/procedure in an EPS network. The UE and the network node (e.g., MME, SGSN, and MSC) exchange an MM message to perform the MM operation/procedure.

SM (Session Management) operation/procedure: An operation or procedure for regulating/managing/processing/handling a user plane and/or a bearer context/PDP context of the UE. The SM operation/procedure may be interpreted as including one or more of an SM operation/procedure in a GPRS network and an ESM operation/procedure in an EPS network. The UE and the network node (e.g., MME and SGSN) exchange an SM message to perform the SM operation/procedure.

Low priority UE: A UE configured for NAS signalling low priority. The standard document 3GPP TS 24.301 and TS 24.008 may be incorporated by reference for details thereof.

Normal priority UE: A normal UE not configured with low priority.

Dual priority UE: A UE configured for dual priority. That is, a UE which provides dual priority support is configured for a NAS signalling low priority and also configured to override the NAS signalling low priority indicator. The standard document 3GPP TS 24.301 and TS 24.008 may be incorporated by reference for details thereof.

PLMN: as an abbreviation of Public Land Mobile Network, means a network identification number of a mobile communication provider. In roaming case of the UE, the PLMN is classifed into a home PLMN (HPLMN) and a vistied PLMN (VPLMN).

Hereinafter, an aspect of the present specification is described with reference to the accompanying drawings.

Figure 6:
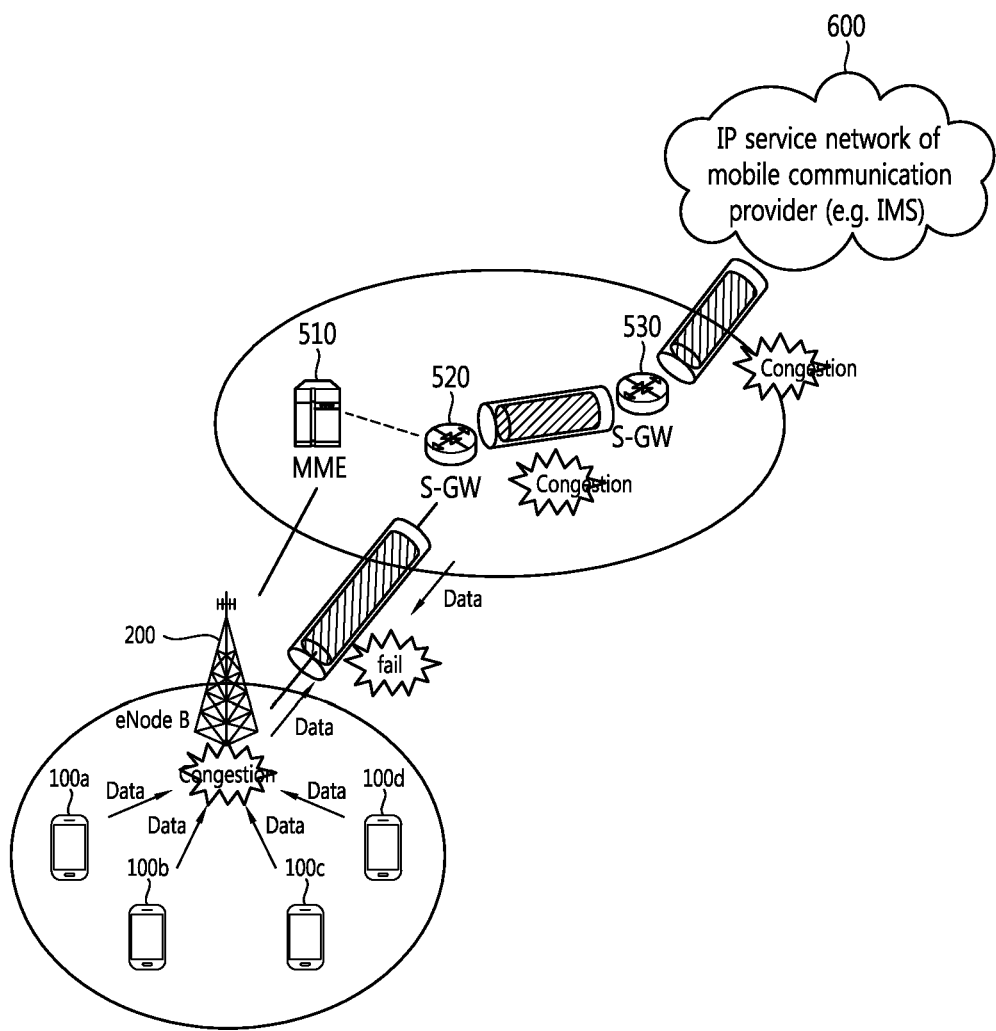
FIG. 6 illustrates a network overloaded state.

FIG. 6 shows a network overload state.

As shown in FIG. 6, many UEs 100a, 100b, 300c, and 300d are present in the coverage of an eNodeB 200, and data transmission/reception is attempted. Accordingly, if traffic is overloaded or congested in an interface between the eNodeB 200 and an S-GW 520, downlink data to the MTC device 100 or uplink data from the UE 100 is not correctly transmitted and thus data transmission fails.

Alternatively, even if an interface between the S-GW 520 and a PDN-GW 530 or an interface between the PDN-GW 530 and an Internet Protocol (IP) service network of a mobile communication operator is overloaded or congested, downlink data to the UEs 100a, 100b, 300c, and 300d or uplink data from the UEs 100a, 100b, 300c, and 300d is not correctly transmitted and thus data transmission fails.

If an interface between the eNodeB 200 and the S-GW 520 is overloaded or congested or if an interface between the S-GW 520 and the PDN-GW 530 is overloaded or congested, a node (e.g., MME) of the core network performs a NAS level congest control to avoid or control signaling congestion and APN congestion.

The NAS level congestion control consists of an APN based congestion control and a general NAS level mobility management control.

The APN based congestion control implies an EMM, GMM, and (E)SM signal congestion control related to a UE and a specific APN (i.e., an APN related to a congestion state), and includes an APN based session management congestion control and an APN based mobility management congestion control.

On the other hand, the general NAS level mobility management control implies that a node (MME, SGSN) in the core network rejects a mobility management signaling request which is requested by the UE/MS in a general network congestion or overload situation to avoid the congestion and the overload.

In general, if the core network performs the NAS level congestion control, a back-off timer value is transmitted to a UE in an idle mode or a connected mode by being carried on a NAS reject message. In this case, the UE does not request an EMM/GMM/(E)SM signal to the network until the back-off timer expires. The NAS reject message is one of an Attach reject, a Tracking Area Updating (TAU) reject, a Routing Area Updating (RAU) reject, a service reject, an extended service reject, a PDN connectivity reject, a bearer resource allocation reject, a bearer resource modification reject, and a deactivate EPS bearer context request reject.

The back-off timer may be classified into a Mobility Management (MM) back-off timer and a Session Management (SM) back-off timer.

The MM back-off timer operates independently for each UE, and the SM back-off timer operates independently for each APN and each UE.

Simply, the MM back-off timer is for controlling an EMM/GMM signal (e.g., Attach, TAU/RAU request, etc.). The SM back-off timer is for controlling an (E)SM signal (e.g., PDN connectivity, Bearer Resource Allocation, Bearer Modification, PDP Context Activation, PDP Context Modification request, etc.).

More specifically, the MM back-off timer is a mobility management related back-off timer used to control a case where a network congestion occurs, and is a timer which prevents the UE from performing an attach, location information update (TAU, RAU), and service request procedure during the timer is running. However, exceptionally in case of an emergency bearer service and a Multimedia Priority Service (MPS), the UE may be allowed to perform the request even if the timer is running.

As described above, the UE may receive the MM back-off timer value from a core network node (e.g., MME, SGSN, etc.) or from a lower layer (access stratum). In addition, the timer value may be randomly set by the UE within the range of 15 minutes to 30 minutes.

The SM back-off timer is a session management related back-off timer used to control a case where a network congestion occurs, and is a timer which prevents the UE from configuring or changing an associated APN-based session. However, likewise, exceptionally in case of an emergency bearer service and a Multimedia Priority Service (MPS), the UE 100 may be allowed to perform the request even if the timer is running.

The UE receives the SM back-off timer value from the core network node (e.g., MME, SGSN, etc.), and is randomly set within up to 72 hours. In addition, the timer value may be randomly set by the UE/MS within the range of 15 minutes to 30 minutes.

On the other hand, when the congestion occurs in the eNodeB 200, the eNodeB 200 may perform congestion control. That is, when the UE requests RRC connection establishment for data transmission of the user plane, if the eNodeB 200 is in the congest state, the eNodeB 200 may transmit a reject response to the UE together with an extended wait timer. In this case, the RRC connection establishment request may not be re-attempted until the extended wait timer expires. On the contrary, when the UE requests the RRC connection for transmitting the signal of the control plane for circuit switch (CS)-based call reception, even through the eNodeB 200 is in the congest state, the RRC connection request may not be rejected.

Figure 7:
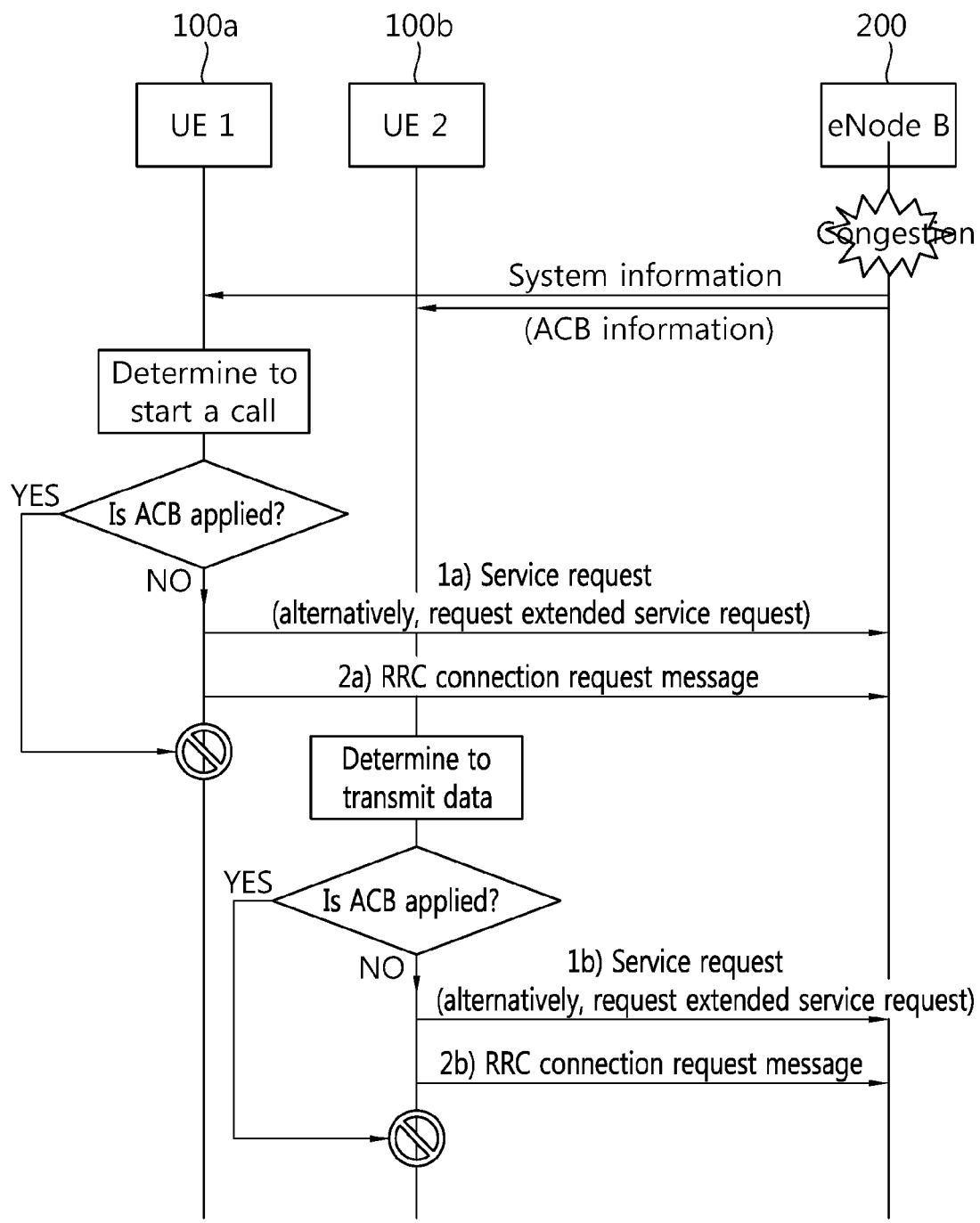
FIG. 7 is an exemplary flowchart illustrating an access barring operation in a network congested state.

FIG. 7 is an exemplary flowchart illustrating an access barring operation in a network congested state.

As illustrated in FIG. 7, in the overload or congest state of the network or the eNodeB 200, the eNodeB 200 may broadcast access class barring (ACB)-related information through system information. The system information may be system information block (SIB) type 2.

The SIB type 2 may include ACB-related information like the following table.

TABLE 2

| Field | Description |
|---|---|
| ac-BarringFactor | When a random value generated by the UE is smaller than a value of ac-BarringFactor, access is allowed. If not, the access is barred. |
| ac-BarringForCSFB | ACB for circuit switch (CS) fallback. The CS fallback converts a VoLTE call to a previous 3G call. |
| ac-BarringForEmergency | ACB for emergency service |
| ac-BarringForMO-Data | ACB for mobile orienting data |
| ac-BarringForMO-Signalling | ACB for mobile orienting control signal |
| ac-BarringForSpecialAC | ACB for specific access classes, that is, 11 to 15. |
| ac-BarringTime | Represents time when the access is barred. |
| ssac-BarringForMMTEL-Video | ACB for each service for mobile orienting of MMTEL video. |
| ssac-BarringForMMTEL-Voice | ACB for each service for mobile orienting of MMTEL voice. |

Meanwhile, UE1 100a determines an IMS service, for example, mobile orienting of a call by VoLTE and generates a service request message. Similarly, UE2 100b determines mobile orienting of general data and generate the service request message.

Sequentially, the UE1 100a generates an RRC connection request message. Similarly, the UE2 100b generate the RRC connection request message.

Meanwhile, the UE1 100a performs access barring check (that is, whether the ACB is applied). Similarly, the UE2 100b performs access barring check (that is, whether the ACB is applied).

If the ACB is not applied, the UE1 100a and the UE2 100b may transmit a service request (alternatively, an extended service request) message and the RRC connection request message, respectively. However, when the ACB is applied, both the UE1 100a and the UE2 100b may not transmit the RRC connection request message, respectively.

The access barring check will be described in detail as follows. Generally, at least one of 10 access classes (for example, AC0, AC1, . . . , and AC9) is randomly allocated to the UE. Exceptionally, for urgent emergency access, AC10 is allocated. As such, the value of the randomly allocated access class may be stored in each USIM of the UE1 100a and the UE2 100b. Then, the UE1 100a and the UE2 100b verify whether the access barring is applied, by using a barring factor included in the received ACB-related information, based on the stored access class. The access barring check is performed in each access stratum (AS) layer, that is, an RRC layer of the UE1 100a and the UE2 100b.

The access barring check will be described in more detail as follows.

The ac-BarringPerPLMN-List is included in the SIB type 2 received by each of the UE1 100a and the UE2 100b, and in the case where AC-BarringPerPLMN entry matched with plmn-identityIndex corresponding to the PLMN selected in an higher layer is included in the ac-BarringPerPLMN-List, AC-BarringPerPLMN entry matched with the plmn-identityIndex corresponding to the PLMN selected by the higher layer is selected.

Next, when the UE1 100a and the UE2 100b perform the RRC connection request, the access barring check is performed by using T303 as Tbarring and using ac-BarringForMO-Data as a barring parameter.

When the barring is determined, each AS(RRC) layer of the UE1 100a and the UE2 100b notifies a failure of the RRC connection establishment to the higher layer.

Subsequently, as such, when the access is barred, each AS(RRC) layer determines whether a T302 timer or a Tbarring timer is driving. If the timer is not driving, the T302 timer or the Tbarring timer is driven.

Meanwhile, while the T302 timer or a Tbarring timer is driving, the AS(RRC) layer considers that all the access to the corresponding cell is barred.

As described above, in the network overload and congest situation, the eNB/RNC provides the ACB-related information to the UE. Then, the UE checks the access barring by using the barring factor included in the received ACB information based on its access class stored in the USIM. Through the access barring check, finally, an access attempt is not performed. That is, when the access to the corresponding cell is barred through the access barring check, the UE does not attempt the access, and when the access to the corresponding cell is not barred, the UE attempts the access. The access barring check is performed in the AS layer. Herein, the access attempt means that the AS(RRC) layer of the UE transmits the RRC connection request message to the eNB/RNC.

Meanwhile, the access barring check performs general mobile originating (MO) services of the UE, for example, originating call, originating data, originating IMS voice, and originating IMS video. That is, the ACB is applied to access of all application programs (but, except for a response to an emergency service or paging).

Figure 8:
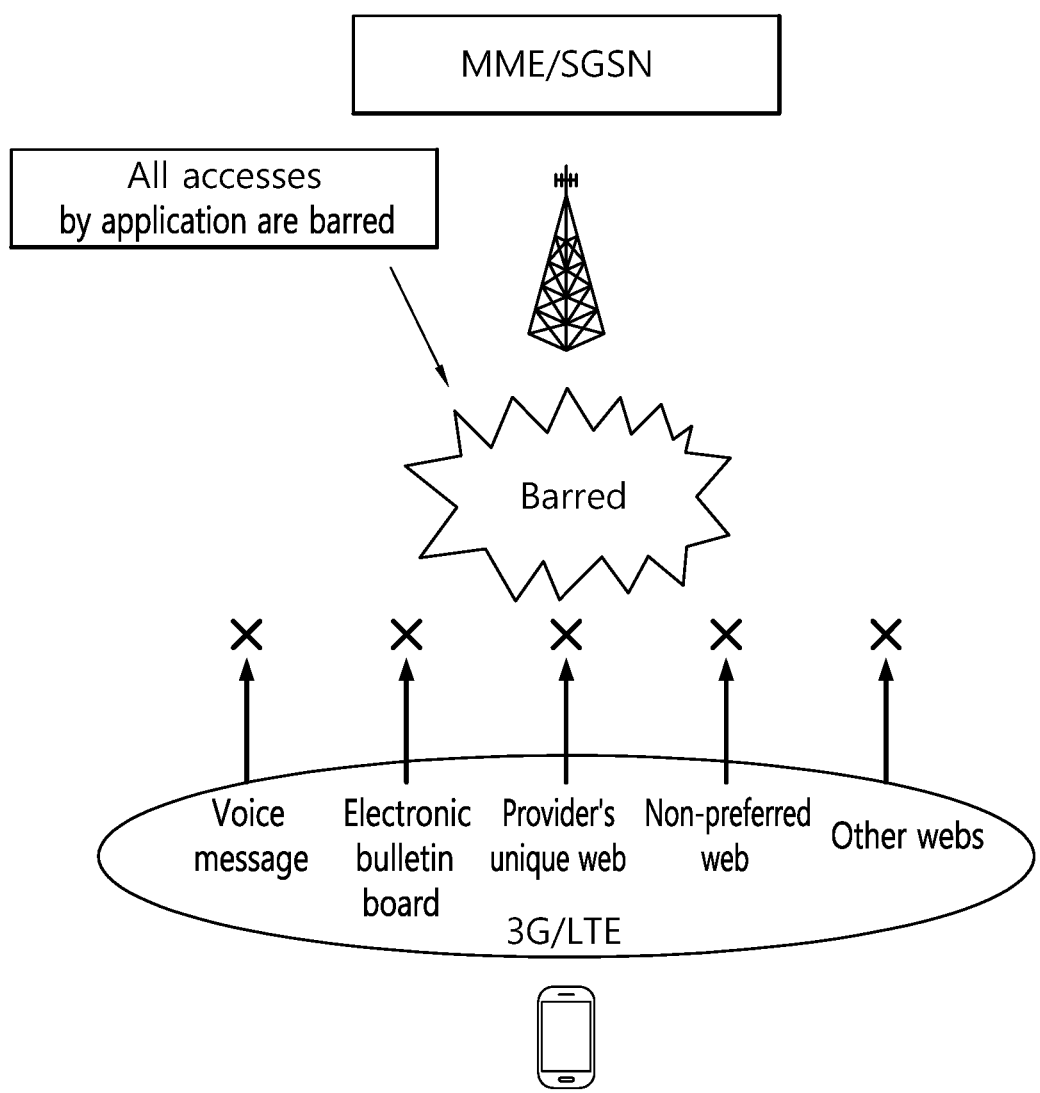
FIG. 8 illustrates an example in which an access due to all applications is barred, when ACB is applied.

FIG. 8 illustrates an example in which access due to all applications is barred, when ACB is applied.

As illustrated in FIG. 8, when it is determined that the ACB is applied, the access due to all of the applications of the UE (but, except for the response to an emergency service or paging) is fully barred.

As such, the access due to all of the applications is barred and thus, the differentiated service is impossible. The problem deteriorates network resource waste and user's experience.

Accordingly, in the network overload and congest situation, a method for differentiating an MO service for each specific application group/category (for example, originating call or originating data) is required. However, in the related art, there is no method of implementing the method.

<Introduction of Application Specific Congestion Control for Data Communication (ACDC)>

As a method of differentiating a normal mobile originating (MO) service, for example, originating call, originating data, originating IMS voice, and originating IMS video, it is proposed application specific congestion control for data communication (ACDC).

Figure 9:
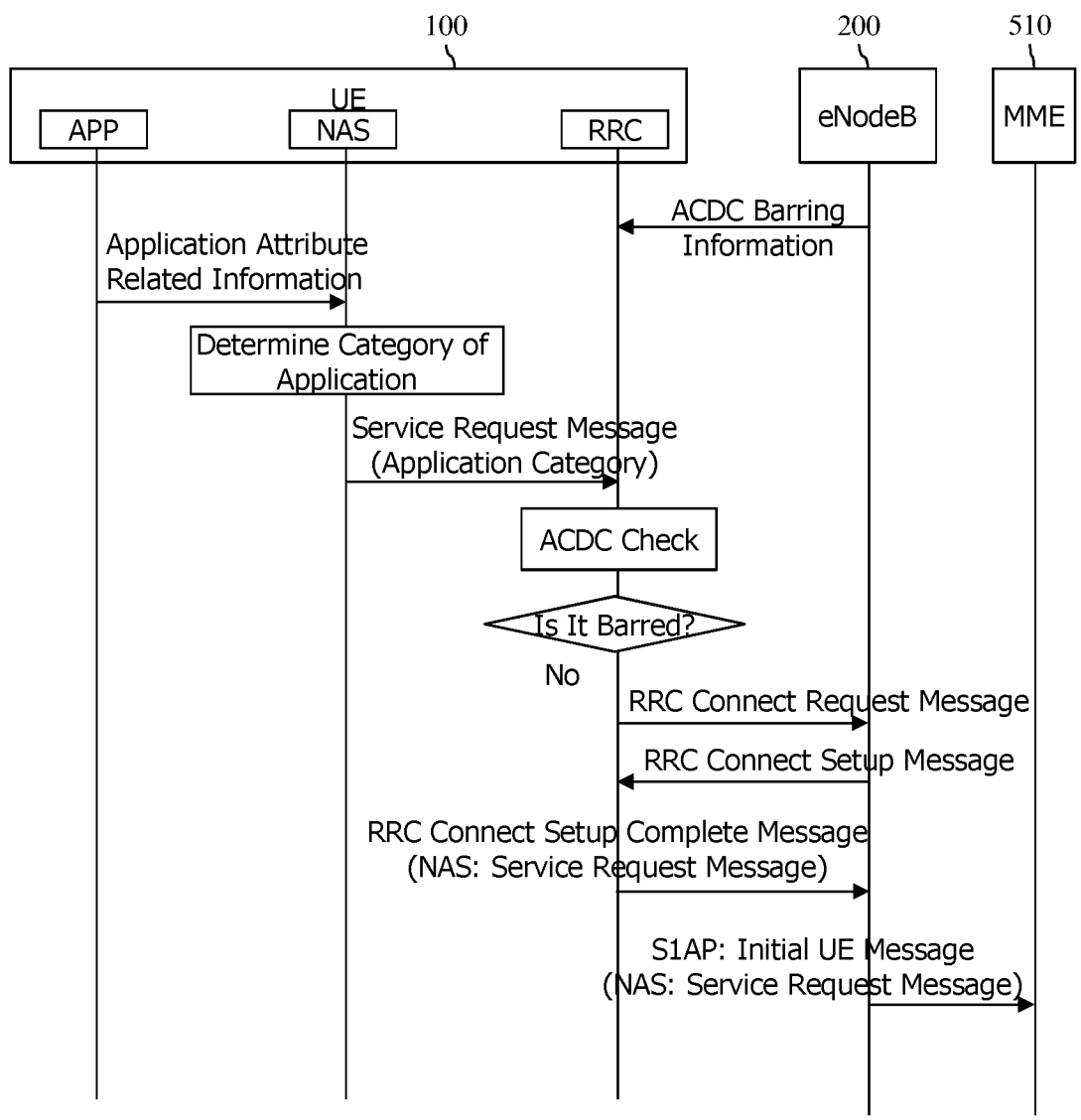
FIG. 9 illustrates a signal flow showing a procedure based on ACDC.

FIG. 9 illustrates a signal flow showing a procedure based on ACDC.

This is described below with reference to FIG. 9.

First, a network (e.g., eNodeB) may provide ACDC barring information to a UE through SIB.

Meanwhile, when a specific application is executed in a UE 100 and a data communication service is required by the specific application, an application layer for controlling execution of the specific application provides application attribute related information to an NAS layer.

Then, on the basis of the application attribute related information received from the application layer, the NAS layer of the UE 100 determines an application category for the ACDC.

Subsequently, when starting a service request procedure for a service connection (transmission of a service request message or transmission of an extended service request message), the NAS layer of the UE 100 delivers information regarding the application category to an AS layer (i.e., RRC layer).

Before performing the service request procedure of the NAS layer (transmission of the service request message or transmission of an extended service request message), on the basis of the application category and ACDC barring information received from the network, the AS layer (e.g., RRC layer) of the UE 100 performs ACDC barring check and thus determines whether to allow or not allow the service request procedure.

If it is determined not to be barred but to be allowed as a result of the ACDC barring check, the AS layer (i.e., RRC layer) of the UE 100 transmits an RRC connection request message to an eNodeB 200.

As described above, a service request required by an application currently being executed in the UE through the ACDC may be allowed or barred through differentiation.

However, once the service request is barred by the ACDC, any other applications in the UE cannot transmit the service request until a timer expires. Therefore, even if the service request is transmitted by an application having a higher priority than an application which causes the barring of the service request, ineffectively, the service request is not accepted. This is described hereinafter with reference to FIG. 10.

Figure 10:
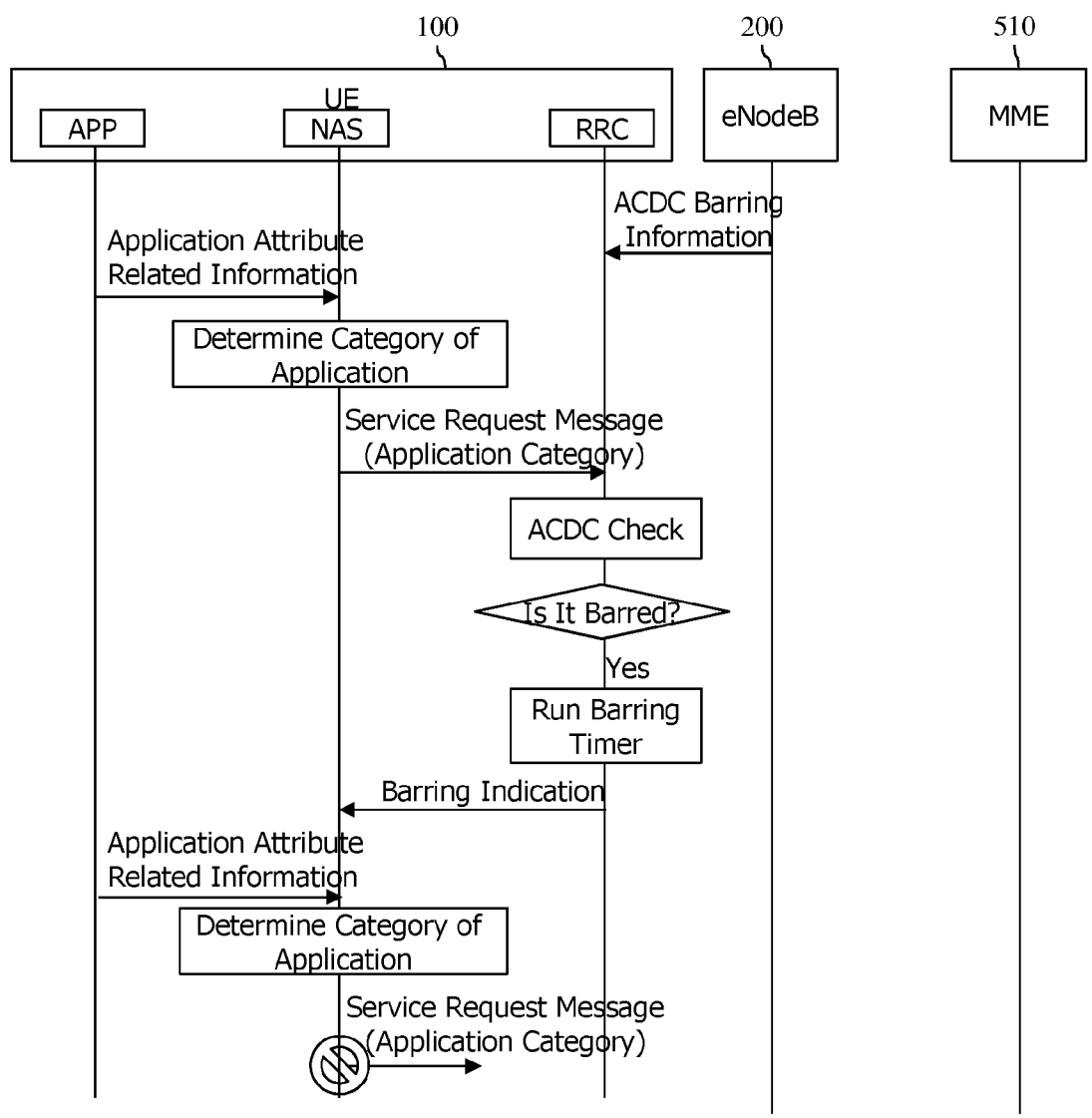
FIG. 10 illustrates an exemplary signal flow showing ineffectiveness of ACDC.

FIG. 10 illustrates an exemplary signal flow showing ineffectiveness of ACDC.

An AS layer (i.e., RRC layer) of a UE 100 performs ACDC barring check and thus bars a request made by a first application. Subsequently, the AS layer drives a barring timer.

If it is barred as a result of the ACDC barring check as described above, the AS layer delivers an indication indicating that an access to a cell is barred to an NAS layer. Then, the NAS layer stops a corresponding NAS service request procedure.

Meanwhile, a second application having a higher priority requests a service.

However, until an indication indicating alleviation of the barred access to the cell is delivered to the NAS layer at the expiry of the barring timer which is running in the AS layer (i.e., RRC layer), the NAS layer cannot perform any differentiation as to the second application having a higher priority than the first application which causes the barring.

Therefore, a service request made by the second application having a higher priority than the first application which causes the barring eventually fails.

Once it is barred by the ACDC as described above, even if the service request is made by the second application having a higher priority than the first application which causes the barring, ineffectively, the service request is not accepted.

Figure 11:
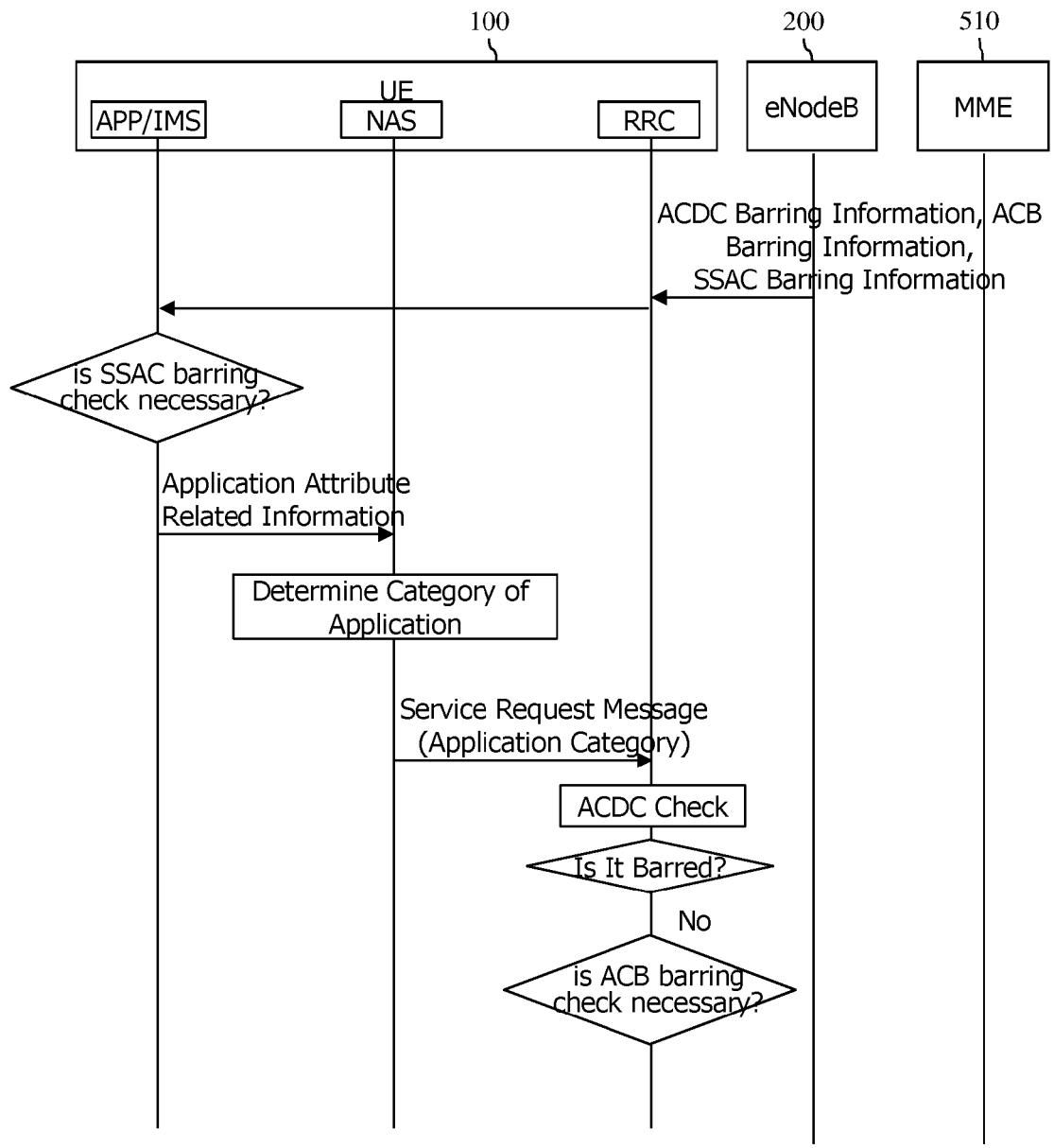
FIG. 11 illustrates a signal flow showing a technical ambiguity when ACDC barring information, ACB barring information, and SSAC barring information are all provided.

FIG. 11 illustrates a signal flow showing a technical ambiguity when ACDC barring information, ACB barring information, and SSAC barring information are all provided.

As can be seen from FIG. 11, a network (e.g., eNodeB) provides ACDC barring information, ACB barring information, and service specific access control (S SAC) barring information to a UE 100.

In this case, it is not clear for the UE how to process several types of barring information.

<Disclosure of the Present Specification>

Accordingly, a disclosure of the present specification provides a method of improving the aforementioned ineffectiveness and ambiguity.

Application attribute related information used in the present specification implies information including one of an application group/category/priority information/ID or one or more combinations thereof. The application attribute related information may be reported by a network to a UE through an attach procedure/TAU procedure/RAU procedure. That is, the application attribute related information may be provided/reported by the network to the UE through an attach accept message, a TAU accept message, an RAU accept message. Alternatively, the application attribute related information may be provided to the UE through an NAS configuration management object (MO) or a new application management object (MO) (e.g., access control MO for each application). Alternatively, the application attribute related information may be pre-configured in the UE by using USIM or the like.

In addition, application category information for ACDC implies application group/category/priority mapping information determined on the basis of the application attribute related information. The application category information for the ACDC may be provided/reported to a UE 100 through an attach/TAU/RAU procedure (e.g., attach accept message, TAU accept message, RAU accept message). In this case, the UE may provide capability indication/information for performing ACDC barring check to the network through an attach/TAU/RAU procedure (e.g., attach request message, TAU request message, RAU request message), and thereafter on the basis thereof (e.g., in case of supporting the ACDC barring check), the application category information for the ACDC may be provided/reported by the network to the UE 100 through the attach/TAU/RAU procedure (e.g., attach request message, TAU request message, RAU request message). Further, the application category information for the ACDC may be included in an NAS configuration management object (MO) or a new application MO (e.g., application specific (access control) management object), and may be provided to the UE 100 through OMA DM. Otherwise, the application category information for the ACDC may be pre-configured in the UE 100 by using USIM or the like.

In addition, ACDC barring information implies information including a barring ratio, barring factor, barring time, roaming information, and ACB skip configuration defined for each application category for (specific) ACDC (i.e., information such as an application group/category/priority (group/category/priority) information/barring ratio for each ID/barring factor, average barring time, ACB skip configuration (ACB skipping is On/configured/True or ACB skipping is Off/not configured/False), etc.).

I. First Disclosure of the Present Specification (Proposal 5 of Provisional Application)

I-1. Proposal 1 of First Disclosure

The proposal 1 of the present specification relates to a method in which, when it is barred by a low application category as a result of ACDC barring check, an application category having a higher priority overrides the barring.

Figure 12:
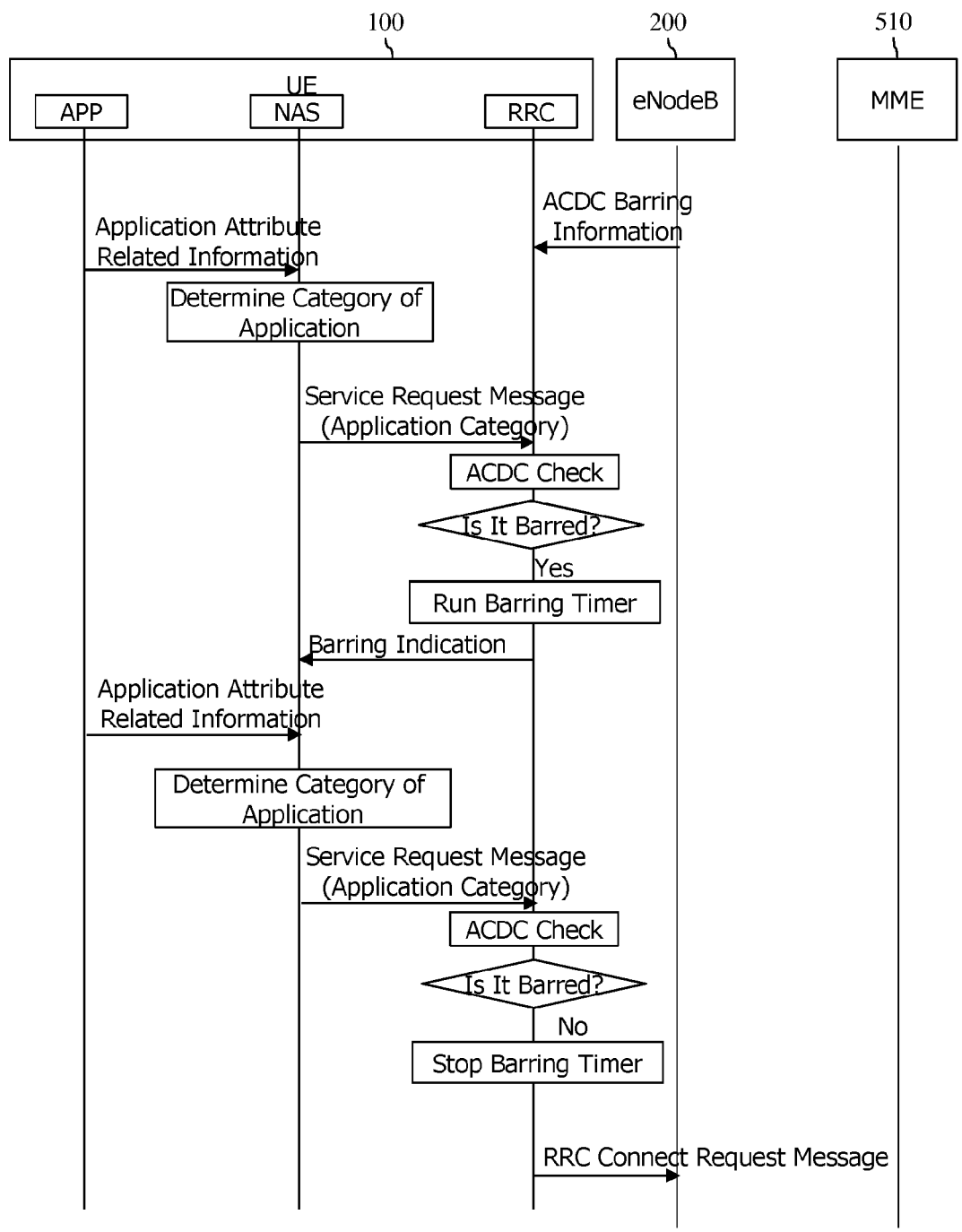
FIG. 12 illustrates an exemplary signal flow of an ACDC procedure according to a proposal 1 of a first disclosure of the present specification.

FIG. 12 illustrates an exemplary signal flow of an ACDC procedure according to the proposal 1 of the first disclosure of the present specification.

Referring to FIG. 12, a network (e.g., eNodeB) may provide ACDC barring information to a UE 100 through SIB. The ACDC barring information is defined for each application category. It is shown in FIG. 11 that the ACDC barring information is received by an AS layer (i.e., RRC layer) of the UE 100. However, the ACDC barring information may also be received by an application layer (or NAS layer). Alternatively, when a data communication service starts, the application layer may receive the information by requesting to the AS layer (i.e., RRC layer).

Meanwhile, when the application layer starts a data communication service, in order to differentiate a service of a specific application, the application layer provides the application attribute related information to the NAS layer, and the NAS layer determines the application category (or a plurality of application categories) for the ACDC on the basis of the application attribute related information. The application category information for the ACDC may be included in an NAS configuration management object (MO) or a new application MO (e.g., application specific (access control) management object), and may be provided to the UE 100 through OMA DM. Otherwise, the application category information for the ACDC may be pre-configured in the UE 100 by using USIM or the like.

Subsequently, the NAS layer provides the determined application category information (e.g., category C) to the AS layer (e.g., RRC layer).

In order to differentiate the application service, the AS layer performs ACDC barring check by using the ACDC barring information received from the network, on the basis of the application category information (e.g., category C) for the ACDC obtained from the NAS layer.

In this case, for example, if a category for an application for the ACDC is C, the AS layer performs the ACDC barring check on the basis of the application category C.

If an access to a serving cell is barred as a result of performing the ACDC barring check, the AS layer (i.e., RRC layer) drives a barring timer. The barring timer may be the same as a barring timer used in ACB, or may be a timer newly defined for the ACDC. Further, the AS layer delivers an indication for reporting the barring to the NAS layer. The indication for reporting the barring may be the same as an indication used in case of being barred in the previous ACB check. Alternatively, the indication for reporting the barring may be a new indication different from the indication used in case of being barred in the previous ACB check.

Then, the NAS layer stops a corresponding signaling connection request procedure (e.g., service request or extended service request procedure), a TAU/RAU request procedure, and an attach request procedure.

Further, the NAS layer records and manages a specific application category (e.g., category C) by which the service request procedure is barred.

Meanwhile, the NAS layer of the UE 100 receives different application attribute related information from the application layer, and thus determines that the different application corresponds to an application category B for ACDC.

If the determined application category has a priority not higher than or equal to that of the application category which causes the barring, the NAS layer may not start an NAS signaling connection request procedure required by the application. However, if the determined application category B has a priority higher than that of the application category C which causes the barring, the NAS layer starts an NAS signaling connection request procedure required by an application belonging to the application category B.

The NAS layer delivers a service request message and information regarding the determined application category to the AS layer.

Then, the AS layer stops the barring timer which is running. Further, the AS layer newly performs the ACDC barring check.

If the ACDC barring check is newly performed and a request of an application belonging to the application category having the higher priority is barred, the AS layer provides an indication indicating the barring to the NAS layer (or application layer), and drives the barring timer. The running of the barring timer may be resuming from the previous stopping, or may be running after initialization of the barring timer.

However, if the request for the application belonging to the application category having the higher priority is allowed as a result of newly performing the ACDC barring check, the AS layer transmits an RRC connection request message to an eNodeB.

I-2. Proposal 2 of First Disclosure

The proposal 2 proposes the aforementioned processing method of the UE when the network (e.g., eNodeB) provides all of ACDC barring information, SSAC barring information, and normal ACB barring information.

(i) As a first method, the UE may perform barring check (i.e., SSAC barring check and ACDC barring check) by using only SSAC related information and ACDC barring information. That is, the normal ACB barring information is not used, and thus ACB barring check is not performed. In this case, the network may additionally provide ACB skip information to the UE to indicate skipping of the normal ACB barring check. The ACB skip information may be received by an AS layer (i.e., RRC layer) of the UE, and the AS layer (i.e., RRC layer) of the UE may skip ACB check according to the received ACB skip information. In this case, the AS layer (i.e., RRC layer) of the UE may first perform SSAC barring check, and thereafter may perform the ACDC barring check.

(ii) As a second method, the UE may apply only the SSAC barring information and the normal ACB barring information. Accordingly, the UE does not perform the ACDC barring check. For example, if MMTEL voice/video or SMS over IP start indication can be provided (received) to an NAS layer of the UE in an IMS layer (or application layer), the NAS layer of the UE does not provide ACDC category information to the AS layer (i.e., RRC layer). Accordingly, the AS layer (i.e., RRC layer) may not perform the ACDC barring check. In this case, the UE first performs the SSAC barring check, and then performs the normal ACB barring check.

(iii) As a third method, if the network provides all of SSAC barring information, ACB barring information, and ACDC barring related information, the UE performs barring check by applying several types of barring information in a predetermined order. For example, the UE first performs SSAC barring check, and then performs ACDC barring check and normal ACB barring check. In this case, the UE may first perform the SSAC barring check, followed by the ACDC barring check and then (finally) the ACB barring check. Alternatively, the UE may first perform the SSAC barring check, followed by the ACB barring check and then (finally) the ACBC barring check.

(iv) As a fourth method, the UE may apply only normal ACB information and ACDC barring related information. That is, the UE does not perform the SSAC barring check. In this case, the network may provide skip information to the UE to indicate skipping of the SSAC barring check.

This information may be received by the AS layer (i.e., RRC layer) and then may be provided to an IMS or application layer. In this case, SSAC may not be performed in the IMS layer (or application layer), and ACDC barring check proposed in the present invention and normal ACB may be applied and performed. In this case, the ACDC barring check may be first performed, followed by the ACB, or the ACB may be first performed, followed by the ACBC barring check.

(v) As a fifth method, the UE may perform ACDC barring check by applying only ACDC barring related information. In this case, the network may provide skip information to the UE to indicate skipping of the SSAC barring check. The skip information may be received by the AS layer (or the RRC layer) of the UE and thereafter may be delivered to the IMS layer or the application layer. The IMS layer (or the application layer) may not perform the SSAC barring check on the basis of the skip information. Alternatively, when ACDC barring information received by the AS layer (or the RRC layer) of the UE or an ACDC indication/information/parameter based thereon is delivered to the NAS layer, the NAS layer may deliver skip information/indication to the IMS layer (or the application layer) to indicate skipping of the SSAC barring check. Accordingly, the IMS layer (or the application layer) may not perform the SSAC barring check. Alternatively, in order to skip the SSAC barring check, the NAS layer of the UE may provide the AS layer (i.e., RRC layer) with information indication/information indicating not to provide the IMS layer (or application layer) with SSAC barring information received from the network (NAS→RRC: Not forwarding SSAC barring info to IMS).

According to this fifth method, only the ACDC barring check may be performed.

The aforementioned fourth and fifth methods will be described in greater detail with reference to the drawings.

Figure 13:
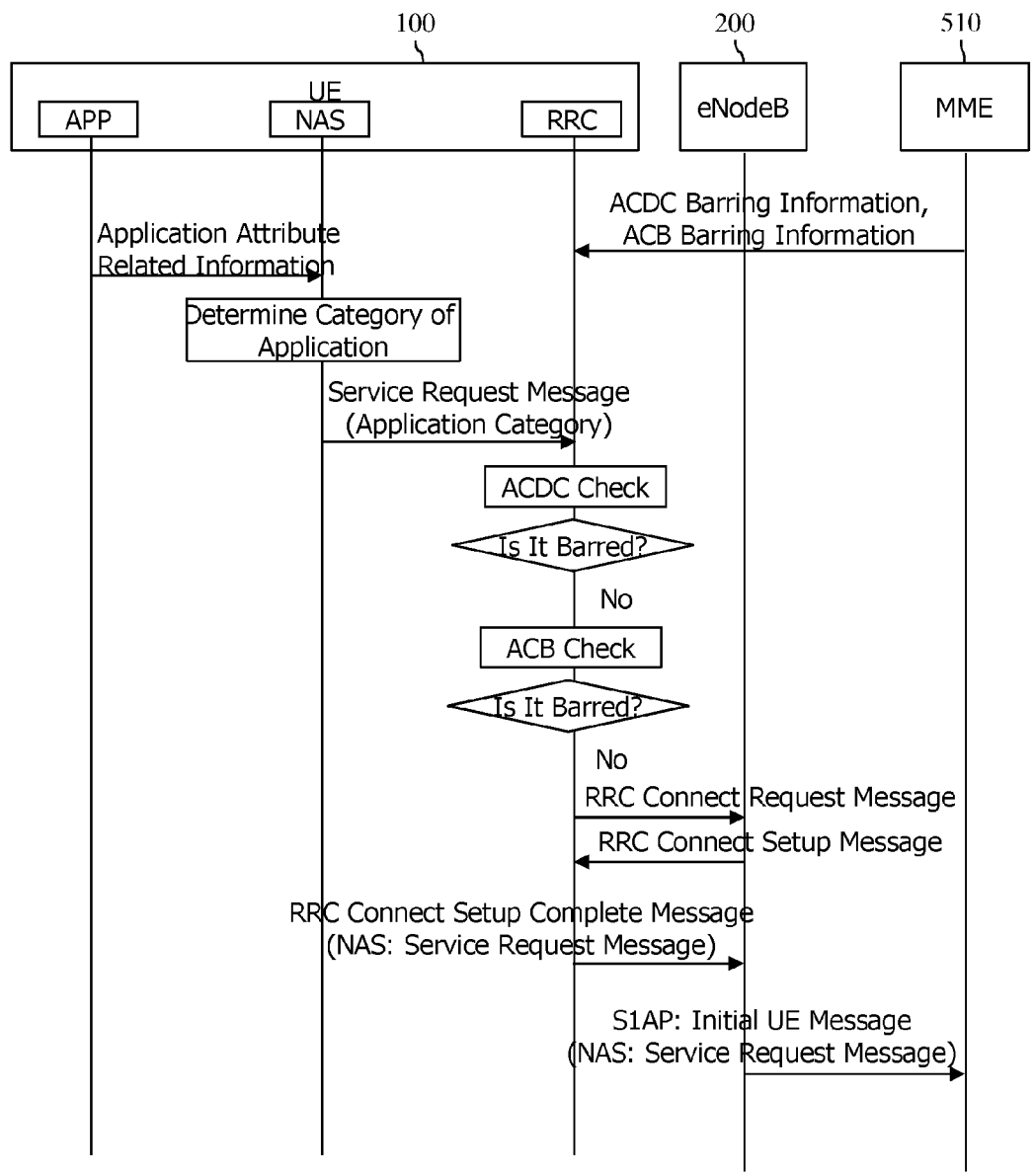
FIG. 13 illustrates an exemplary processing method when ACDC barring information and ACB barring information are both provided.

FIG. 13 illustrates an exemplary processing method when ACDC barring information and ACB barring information are both provided.

As can be seen from FIG. 13, when the ACDC barring information and the ACB barring information are both provided to a UE 100, an AS layer of the UE 100 may first perform ACDC barring check, followed by ACB barring check.

Figure 14:
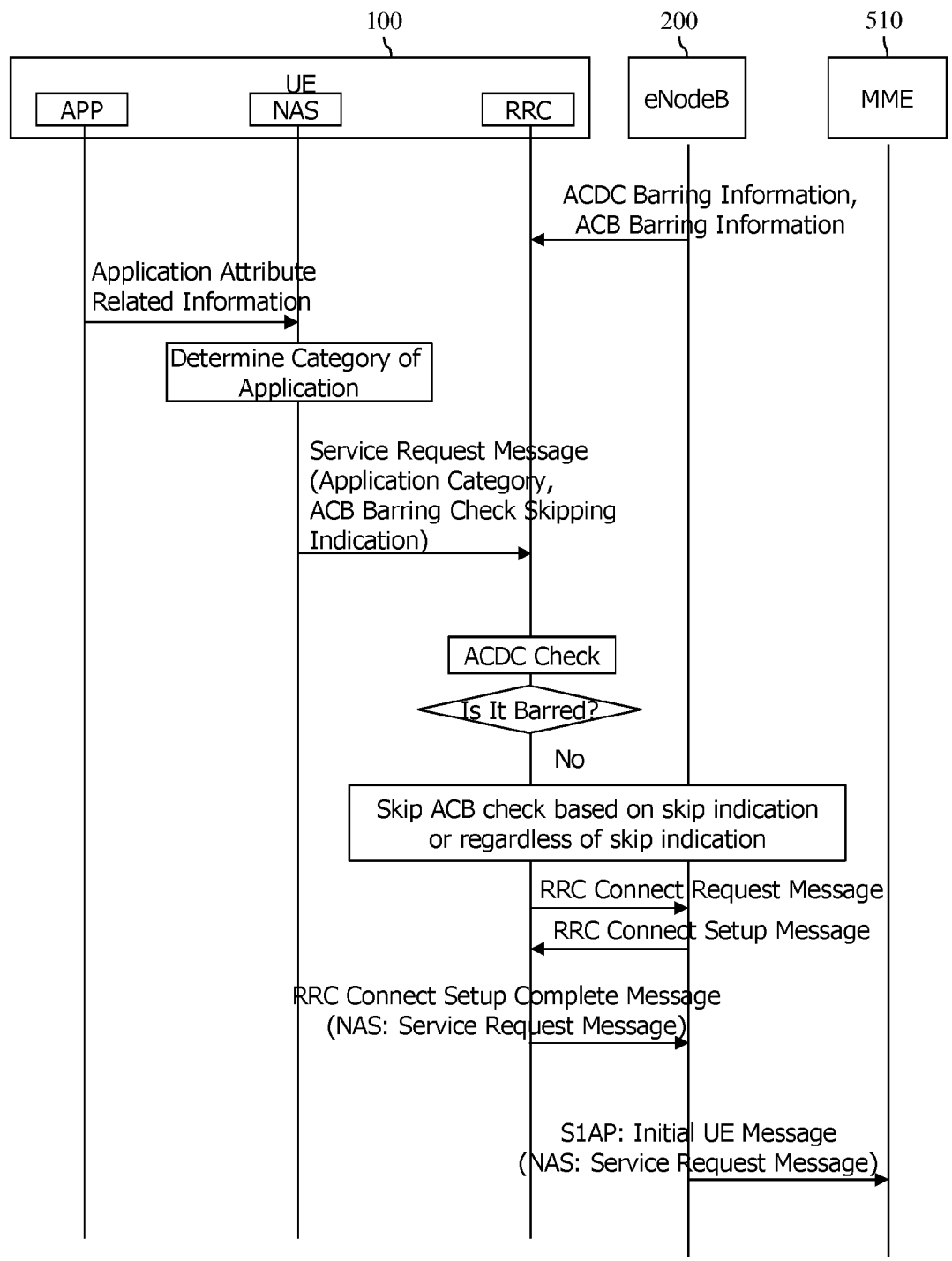
FIG. 14 illustrates another exemplary processing method when ACDC barring information and ACB barring information are both provided.

FIG. 14 illustrates another exemplary processing method when ACDC barring information and ACB barring information are both provided.

As can be seen from FIG. 14, when the ACDC barring information and the ACB barring information are both provided to a UE 100, an AS layer of the UE 100 first performs ACDC barring check. In addition, according to a skip indication delivered from an NAS layer or irrespective of the skip indication, the AS layer of the UE 100 may skip or override the ACB barring check.

On the other hand, when a network (e.g., eNodeB) provides ACDC barring related information and SSAC barring information and/or ACB skip related inforamtion for MMTEL voice/video or SMS over IP/SMS over NAS and/or normal ACB barring information, the UE may skip ACB barring check for MMTEL voide/video or SMS over IP/SMS over NAS. In this case, the UE first performs SSAC barring check, and then skips ACB barring check as to the MMTEL voide/video or SMS over IP/SMS over NAS, and subsequently performs ACDC barring check. Otherwise, even if the ACB skip related information for the MMTEL voice/video or SMS over IP/SMS over NAS is provided from the network, the UE may perform only other access controls instead of skipping the ACB barring check. If the skip information and the ACDC barring related information are used simultaneously, ACDC barring check may be performed only for extra other service requests instead of performing the ACDC barring check for the MMTEL voice/video or SMS over IP/SMS over NAS (that is, the ACDC barring check is skipped). In this case, the network (e.g., eNodeB) may provide an ACB skip indication for the MMTEL voide/video or SMS over IP/SMS over NAS to the AS layer (i.e., RRC layer) through SIB2. The ACB skip indication may imply skipping of only the ACB barring check or may imply skipping of the ACDC barring check as well. Alternatively, the network may additionally provide the ACB skip indication for skipping of the ACB barring check and the ACDC skip indication for skipping of the ACDC barring check.

Meanwhile, the NAS layer provides the AS layer (i.e., RRC layer) with the determined category information when starting a service request procedure and a TAU/RAU/attach prequest procedure, and if it is barred as a result of performing the ACDC barring check, the AS layer (i.e., RRC layer) provides the NAS layer with barring information/indication indicating the barring. Then, the NAS layer records and manages a specific application by which the barring is achieved. The barring information/indication indicating the barring as the result of ACDC check may be different from the barring information/indication based on the result of ACB check. That is, the barring information/indication indicating the barring as the result of ACDC check may be the same as the barring information/indication based on the result of ACB check or may be additional information/indication based on a result of additional ACDC check.

Figure 15:
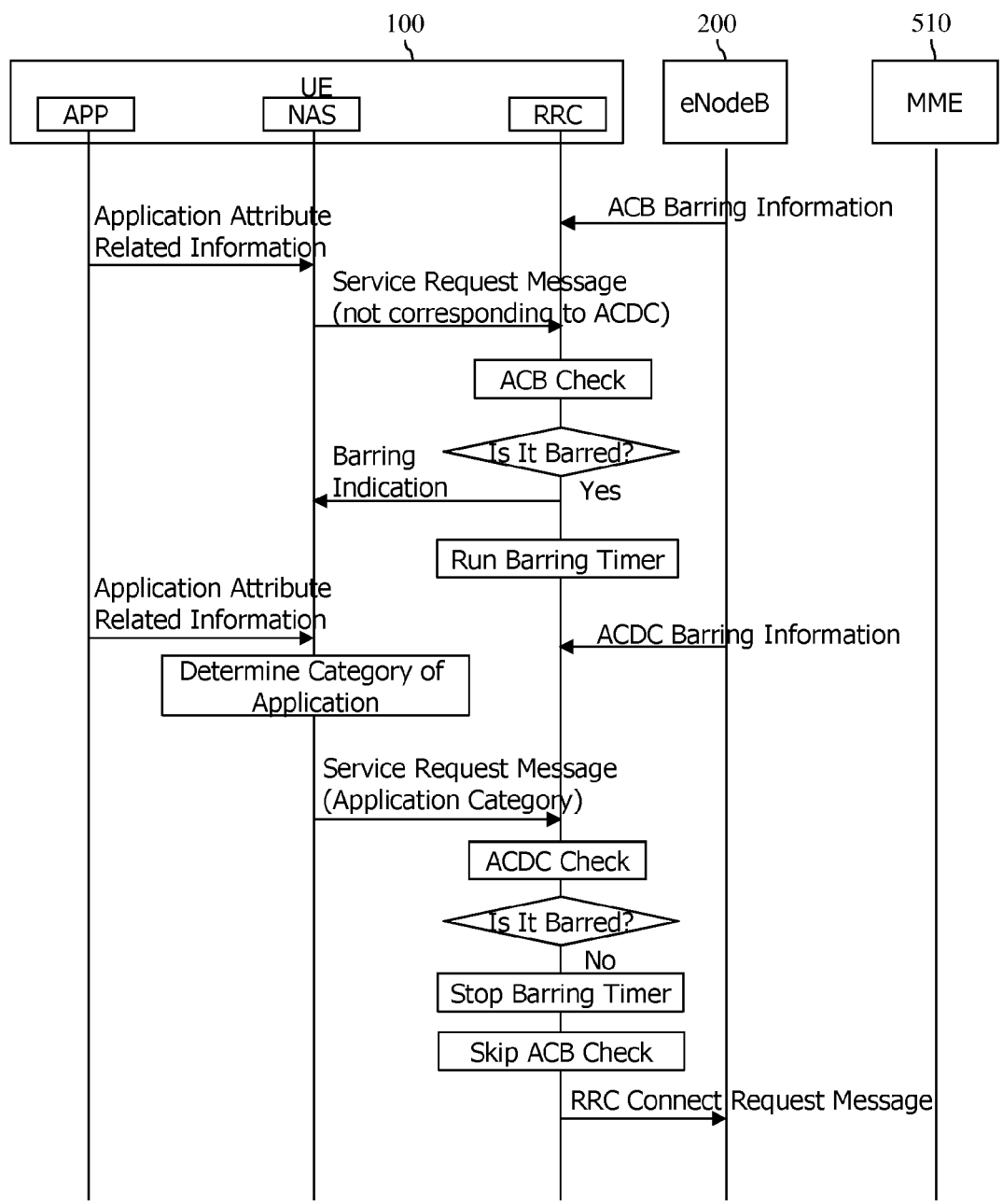
FIG. 15 illustrates another exemplary processing method when ACDC barring information and ACB barring information are both provided.

FIG. 15 illustrates another exemplary processing method when ACDC barring information and ACB barring information are both provided.

Referring to FIG. 15, if it is barred as a result of performing ACB barring check on the basis of ACB barring information received from a network, an AS layer (i.e., RRC layer) of a UE delivers barring information to an NAS layer to indicate the barring. Further, the AS layer (i.e., RRC layer) of the UE drives a barring timer.

Meanwhile, the UE obtains ACDC barring information from the network. If a network access is requested by an application currently being executed, an application layer of the UE provides application attribute related information to the NAS layer.

Even if an access is barred, the NAS layer determines an application category (or a plurality of application categories) for ACDC on the basis of the application attribute related information, and delivers the determined category to the AS layer. The AS layer performs ACDC barring check on the basis of the determined category. If it is not barred as a result of performing the ACDC barring check, the AS layer (i.e., RRC layer) stops the barring timer and skips the ACB check.

As such, the ACDC may override barring based on the ACB.

Meanwhile, the barring indication may report only a fact that it is barred. In this case, whether the barring is based on the ACB or is based on the ACDC cannot be distinguished, and the same barring indication is used.

Meanwhile, in case of receiving a barring indication for which whether the barring is based on the ACB or the ACDC is not distinsuished, the NAS layer may distinguish which one is used in the barring according to the following operation. First, when the NAS layer starts a service request procedure (or extended service request procedure) or a TAU/RAU/attach request proceudre, category information is provided to the AS layer (i.e., RRC layer), and thereafter if the barring indication is received from the AS layer (i.e., RRC layer), the NAS layer regards that the barring is based on the ACDC. However, if the category information is not provided to the AS layer (i.e., RRC layer) when the NAS layer starts the servce request procedure (or extended service request procedure) or the TAU/RAU/attach request procedure, the NAS layer regards that the barring is based on the ACB upon receiving the barring indication from the AS layer.

On the other hand, separate barring indications may be used respectively for a case wheter the barring is based on the ACB and a case where the barring is based on the ACDC. This will be described below with reference to FIG. 16.

Figure 16:
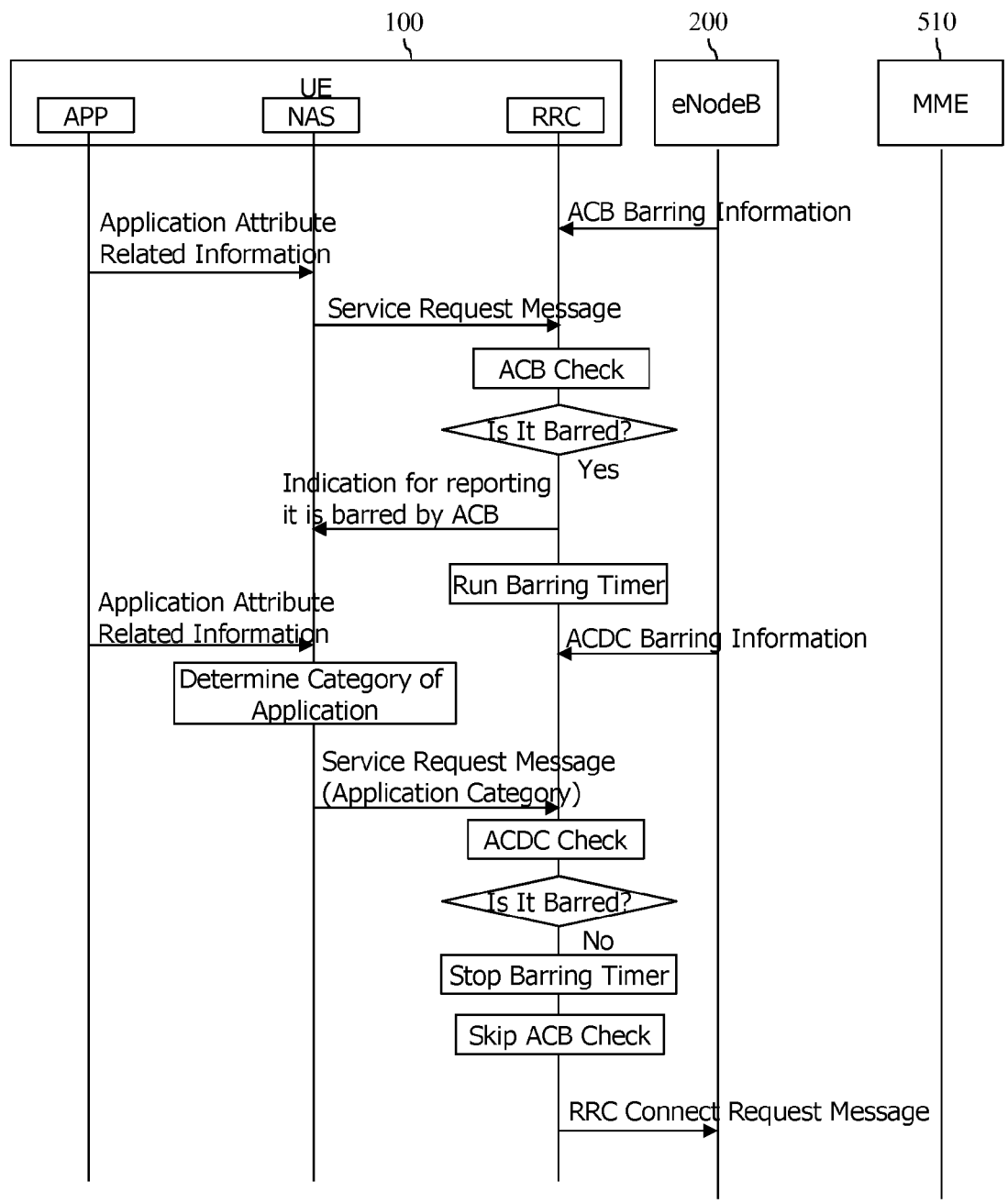
FIG. 16 illustrates another exemplary processing method when ACDC barring information and ACB barring information are both provided.

FIG. 16 illustrates another exemplary processing method when ACDC barring information and ACB barring information are both provided.

Referring to FIG. 16, if a network access is requested by an application currently being executed, an application layer of a UE provides an NAS layer with application attribute related information.

The NAS layer does not determine a category for the application currently being executed, and thus delivers a service request message (or extended service request message) not including category information and a TAU/RAU/attach request message to an AS layer.

If it is barred as a result of performing ACB barring check on the basis of ACB barring information received from the network, the AS layer (i.e., RRC layer) delivers a barring indication to the NAS layer to indicate that it is barred by ACB. Further, the AS layer (i.e., RRC layer) of the UE drives a barring timer.

Meanwhile, the UE obtains ACDC barring information from the network. If a network access is requested by an application currently being executed, an application layer of the UE provides application attribute related information to the NAS layer.

Even if an access is barred, the NAS layer determines an application category (or a plurality of application categories) for ACDC on the basis of the application attribute related information, and delivers the determined category to the AS layer. The AS layer performs ACDC barring check on the basis of the determined category. If it is not barred as a result of performing the ACDC barring check, the AS layer (i.e., RRC layer) stops the barring timer and skips the ACB check.

As such, the ACDC may override barring based on the ACB.

On the other hand, the NAS layer of the UE may check whether it is set to any one of access classes (ACs) 11 to 15, and only when it is not set to the ACs 11 to 15, ACDC barring check may be performed based on the ACDC barring information. If it is set to the ACs 11 to 15, the NAS layer does not use the ACDC barring information. In this case, the NAS layer does not determine a category for the application currently being executed, and thus does not provide category information to the AS layer (i.e., RRC layer). Then, since the category information is not provided to the NAS layer, the AS layer (i.e., RRC layer) does not apply the ACDC barring information and thus performs only normal ACB barring check without having to perform the ACDC barring check.

The content described up to now will be described again as follows according to the sections 5.3.3.2 of standard TS 36.331(v12.7.0) document.

If a higher layer of a UE requests to establish an RRC connection, the UE operates as follows.

1> If the higher layer indicates that the RRC connection corresponds to ACDC,

2> and if an SIB type 2 includes ACDC-BarringPerPLMN-List and includes ACDC-BarringPerPLMN having plmn-IdentityIndex corresponding to PLMN selected by the higher layer, 3> an ACDC-BarringPerPLMN entry having plmn-IdentityIndex corresponding to PLMN selected by the higher layer is selected.

3> Further, irrespective of a common barring parameter included in the SIB type 2, the selected ACDC-BarringPerPLMN entry is used for ACDC barring check.

2> Otherwise,

2> the common barring parameter included in the SIB type 2 is used for ACDC barring check.

2> If the SIB type 2 includes ac-BarringForACDC,

3> if the ac-BarringForACDC includes a BarringPerACDC-Category entry corresponding to an ACDC category selected by the higher layer, 4> the BarringPerACDC-Category-r13 entry corresponding to the ACDC category selected by the higher layer is selected.

3> Otherwise,

4> a last BarringPerACDC-Category entry in BarringPerACDC-CategoryList is selected.

3> If it is intended to establish the RRC connection for originating call,

4> barring check is performed by using T3xx as Tbarring and by using BarringPerACDC-Category-r13 as an AC barring parameter.

4> If an access for a cell is barred,

5> it is reported to the higher layer that the establishment of the RRC connection has failed, and it is reported to the higher layer that an access for the originating call is barred by ACDC.

3> Otherwise, if the UE intends to establish the RRC connection for originating signaling, 4> barring check is performed by using T3yy as Tbarring and by using BarringPerACDC-Category-r13 as an AC barring parameter.

4> If an access of a cell is barred,

5> it is reported to the higher layer that the establishment of the RRC connection has failed, and it is reported to the higher layer that an access for the originating signaling is barred by ACDC.

The content described up to now will be described again as follows according to the sections 5.3.3.4 of standard TS 36.331(v12.7.0) document.

The UE performs the following operation.

1> A radio resource configuration procedure is performed according to received radioResourceConfigDedicated.

1> If it is stored, cell reselection priority information provided by idleModeMobilityControlInfo is deleted.

1> If a T3xx timer is running, the timer stops.

1> If a T3yy timer is running, the timer stops.

1> A procedure based on the section 5.3.3.5 is performed as follows.

The content described up to now will be described again as follows according to the sections 5.3.3.5 of standard TS 36.331(v12.7.0) document.

The UE performs the following operation.

1> During a T300, T302, T303, T305, T306, T3xx, or T3yy timer is running, if cell reselection occurs, 2> if a T302, T303, T305, T306, T3xx, and/or T3yy timer is running, 3> the running T302, T303, T305, T306, T3xx, T3yy timer stops.

3> A procedure based on the section 5.3.3.7 is performed as follows.

The content described up to now will be described again as follows according to the sections 5.3.3.7 of standard TS 36.331(v12.7.0) document.
1> If a T3xx timer expires or stops,
2> if a T302 timer is not running,
3> it is reported to the higher layer that ACDC barring for originating call is alleviated.
1> If a T3yy timer expires or stops,
2> if a T302 timer is not running,
3> it is reported to the higher layer that ACDC barring for originating signaling is alleviated.

The content described up to now will be described again as follows according to the sections 5.3.3.11 of standard TS 36.331(v12.7.0) document.
1> If a T302 timer or "Tbarring" is running and if the timer is not related to ACDC,
2> it is regarded that an access for a cell is barred.
1> Unlike the aforementioned description, if the SIB type 2 includes an "AC barring parameter",
2> if the UE has any one of valid ACs 11 to 15 stored in USIM,
2> if a corresponding bit in ac-BarringForSpecialAC included in the AC barring parameter is set to 0 as to at least one of the valid ACs,
3> it is regarded that an access to a cell is barred.
2> Otherwise,
3> a random value rand distributed uniformly is generated to satisfy a range of 0≤r and <1.
3> If the rand is less than a value indicated by acdc-BarringFactor included in ACDC barring parameter,
4> it is regarded that an access to a corresponding cell is not barred.
3> Otherwise,
4> it is regarded that the access to the corresponding cell is barred.

The content described up to now will be described again as follows according to the sections 6.3.1 of standard TS 36.331(v12.7.0) document.

An eNodeB transmits the SIB type 2 including common radio resource configuration information to all UEs. The SIB type 2 may include the following information.

TABLE 3

```
[[    ac-BarringForACDC-r13        BarringPerACDC-CategoryList-r13OPTIONAL,    --
Need OP
]]
}
ACDC-BarringPerPLMN-List-r13 ::=    SEQUENCE (SIZE (1.. maxPLMN-r11)) OF
ACDC-BarringPerPLMN-r13
ACDC-BarringPerPLMN-r13 ::=         SEQUENCE {
plmn-IdentityIndex-r13          INTEGER (1..maxPLMN-r11),
ac-BarringForACDC               BarringPerACDC-CategoryList-r13  OPTIONAL,
}
BarringPerACDC-CategoryList-r13 ::= SEQUENCE (SIZE (1.. maxACDC-Cat-r13)) OF
BarringPerACDC-Category-r13
BarringPerACDC-Category-r13 ::= SEQUENCE {
acdc-BarringConfig-r13         SEQUENCE {
ac-BarringFactor-r13        ENUMERATED {
p00, p05, p10, p15, p20, p25, p30, p40,
p50, p60, p70, p75, p80, p85, p90, p95},
ac-BarringTime-r13         ENUMERATED {s4, s8, s16, s32, s64, s128, s256, s512}
}                          OPTIONAL
}
}
```

Each field of the above table is described below.

TABLE 4

SIB type 2 field description acdc-BarringConfig-r13
If this parameter does not exist in a first entry of barringPerACDC-CategoryList as to a higher ACDC category, a value of ac-BarringFactor of this parameter is set to 1.
If this parameter does not exist in an entry of barringPerACDC-CategoryList as to an ACDC category, it is regarded as the same as a previous entry of the barringPerACDC-CategoryList.
barringPerACDC-CategoryList-r13
It is a list of barringPerACDC-Category for each ACDC category. A first entry in this list corresponds to a highest ACDC category. The highest category is a category which is barred to the minimum extent in an attempt of accessing a cell. A second entry in the list corresponds to a second highest ACDC category. The second highest ACDC category has a higher barring probability than the highest category. A last entry in the list corresponds to a lowest ACDC category. The lowest ACDC category has a highest barring probability.

Meanwhile, a timer is summarized as shown in the following table.

TABLE 5

| Timer | starting condition | stopping condition | at the expiry of timer |
|---|---|---|---|
| T3xx | When performing RRC connection establishment for originating call, and when the access is barred by ACDC. | When entering the RRC connected state and when performing cell reselection. | It is reported to the higher layer that ACDC barring is alleviated. |
| T3yy | When performing RRC connection establishment for originating signaling and when the access is barred by ACDC. | When entering the RRC connected state and when performing cell reselection. | It is reported to the higher layer that ACDC barring is alleviated. |

II. Second Disclosure of the Present Specification (Proposals 10 and 15 of Provisional Applications)

When a UE is set to a low priority (i.e., the UE is set to NAS signaling low priority) or a dual priority (i.e., the UE is not set to the NAS signaling low priority), this means that service differentiation (ACDC barring check) is not performed accordnig to the disclosure of the present specifiction.

Otherwise, when the UE is set to the low priority (i.e., the UE is set to the NAS signaling low priority) or the dual priority (i.e., the UE is not set to the NAS signaling low priority), an access control may be performed by appying SSAC, ACB, or the like instead of performing the ACDC barring check according to the disclosure of the present specifciation.

When the UE is set to the low priority (i.e., the UE is set to the NAS signaling low priority) or the dual priority (i.e., the UE is not set to the NAS signaling low priority), a low priority indicator in a device properties IE of an NAS message (an EMM NAS message and an ESM message: attach request, TAU request, RAU request, service request, extended service request, PDN connectivity request, bear resource allocation request, bearer resource modification request, etc.) implies that the UE is set to the NAS signaling low priority or the UE is not set to the NAS isnglinag low priority.

Meanwhile, if the UE/MS set to the NAS signaling low priority and extended access barring (EAB) receives ACDC barring information for each ACDC category from a network (e.g., eNB/NB, MME/SGSN), the application layer and the NAS and AS layer (i.e., RRC layer) perform service connection differentiation (ACDC barring check) and do not perform the EAB. Alternatively, only the EAB may be performed and the service connection differentiation (ACDC barring check) may not be performed. Alternatively, the service connection differentiation (ACDC barring check) and the EAB may be both performed. Whether to perform the service connection differentiation and the EAB may be finally determined according to a network configuration or a UE configuration.

III. Proposal 3 of the Present Specification (Proposal 13 of Provisional Application)

Hereinafter, the proposal 3 of the present specification will be described with reference to the drawings.

Figure 17:
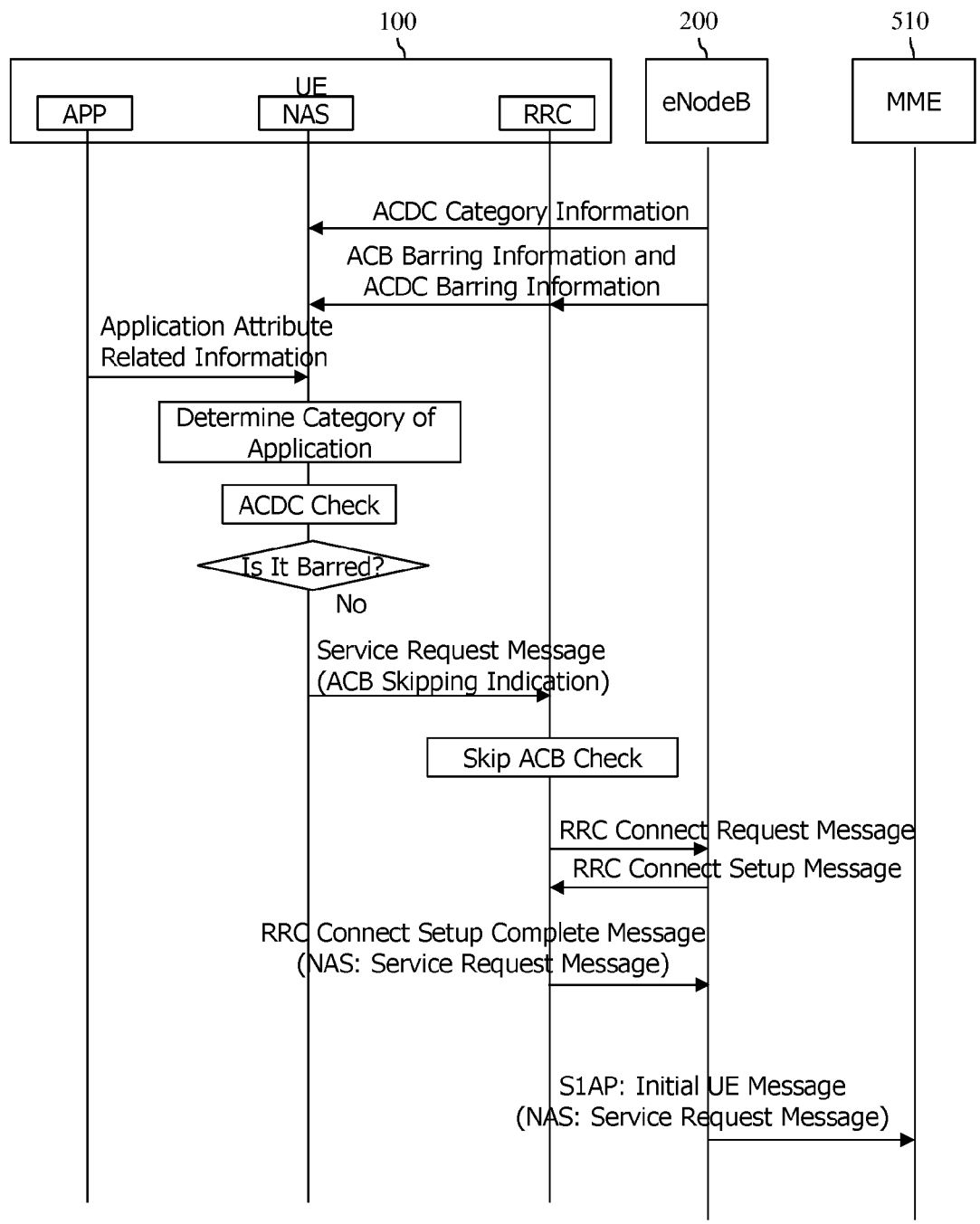
FIG. 17 and FIG. 18 illustrate an exemplary procedure according to a proposal 3 of the present specification.
Figure 18:
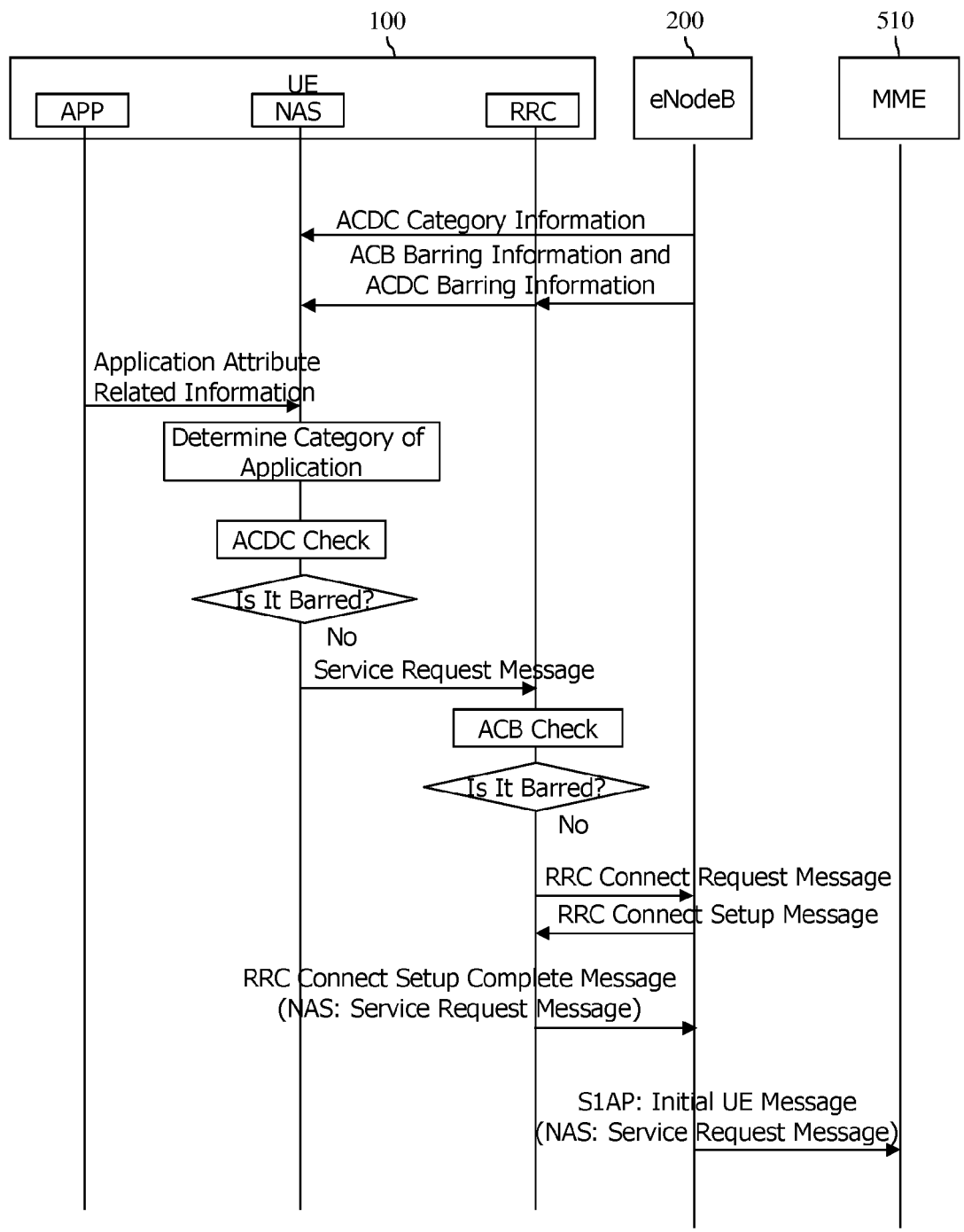

FIG. 17 and FIG. 18 illustrate an exemplary procedure according to the proposal 3 of the present specification.

(step0) First, although not shown, ACDC category information may be defined/configured in NAS configuration management object (MO) or new application MO (e.g., application specific (access control) management object), and in this case, the ACDC category information of the NAS configuration MO or the new application MO (e.g., the application specific (access control) management object) may be provided to a UE through OMA DM. Otherwise, the ACDC category information may be pre-configured in the UE using USIM or the like. In this case, an NAS layer or application layer (or application control layer including an operating system (OS)) or AS layer (i.e., RRC layer) of the UE may obtain ACDC category related information through an AT-command or the like.

(step1) A network (i.e., eNodeB) provides the ACDC barring related information to the UE through SIB. More specifically, the ACDC barring information may be provided when the UE is in an EMM-idle or EMM-connected mode (RRC-idle or RRC-connected mode). The ACDC barring related information is received by the AS layer (i.e., RRC layer) of the UE from the network. The AS layer (i.e., RRC layer) provides the NAS layer (or IMS layer or application layer) with the ACDC barring related information provided from the network. This information may be provided by the AS layer (i.e., RRC layer) periodically or when an event occurs/changes or when the NAS layer (or IMS layer or application layer) requests to provide the information.

If the ACDC barring related information and normal ACB barring information are simultaneously provided to the AS layer (i.e., RRC layer) from the network (i.e., eNodeB) through SIB, the AS layer (i.e., RRC layer) of the UE may provide both of the ACDC barring related information and the ACB barring information to the NAS layer (or IMS layer or application layer).

The application layer provides application attribute related information/ID to the NAS layer when a service connection is attempted to provide an application service (e.g., originating data or originating signaling). Further, (service connection session) setting/start indication/information may be provided together to the NAS layer.

(step2) When an application service start request and the application attribute related information/ID are provided from the application layer, the NAS layer performs a service request procedure (i.e., service request or extended service request) or a TAU procedure (i.e., transmission of a tracing area update request message). In this case, an ACDC category for the application attribute related information/ID provided from the application layer is determined on the basis of the ACDC category information obtained in the above step 0. Thereafter, ACDC barring check is performed on the basis of the ACDC barring information provided from the AS layer (i.e., RRC layer). Upon passing the ACDC barring check, the service request procedure (i.e., service request or extended service request) or the TAU procedure is performed. Upon failing to pass the ACDC barring check, the service request procedure or the TAU procedure is not performed.

(step3) When a service request procedure or a TAU procedure starts for an application service connection of the NAS layer, if ACDC barring information provided from the network (i.e., eNodeB) and normal ACB barring information are provided simultaneously, the AS layer (i.e., RRC layer) does not apply (or does override) the normal ACB barring information and performs an RRC connection establishment request procedure for the application service connection. In this case, since it passes the ACDC barring check for the application service connection of the NAS layer, the AS layer (i.e., RRC layer) may recognize that the service request procedure or the TAU procedure has started. Otherwise, if an indication/information for skipping/overriding the normal ACB barring check is provided together from the NAS layer to the AS layer (i.e., RRC layer), the normal ACB barring check is skipped/overridden, and the RRC connection establishment procedure is performed for the application service connection.

IV. Proposal 4 of the Present Specification (Proposal 14 of Provisional Application)

Hereinafter, the proposal 4 of the present specification will be described with reference to the drawings.

Figure 19:
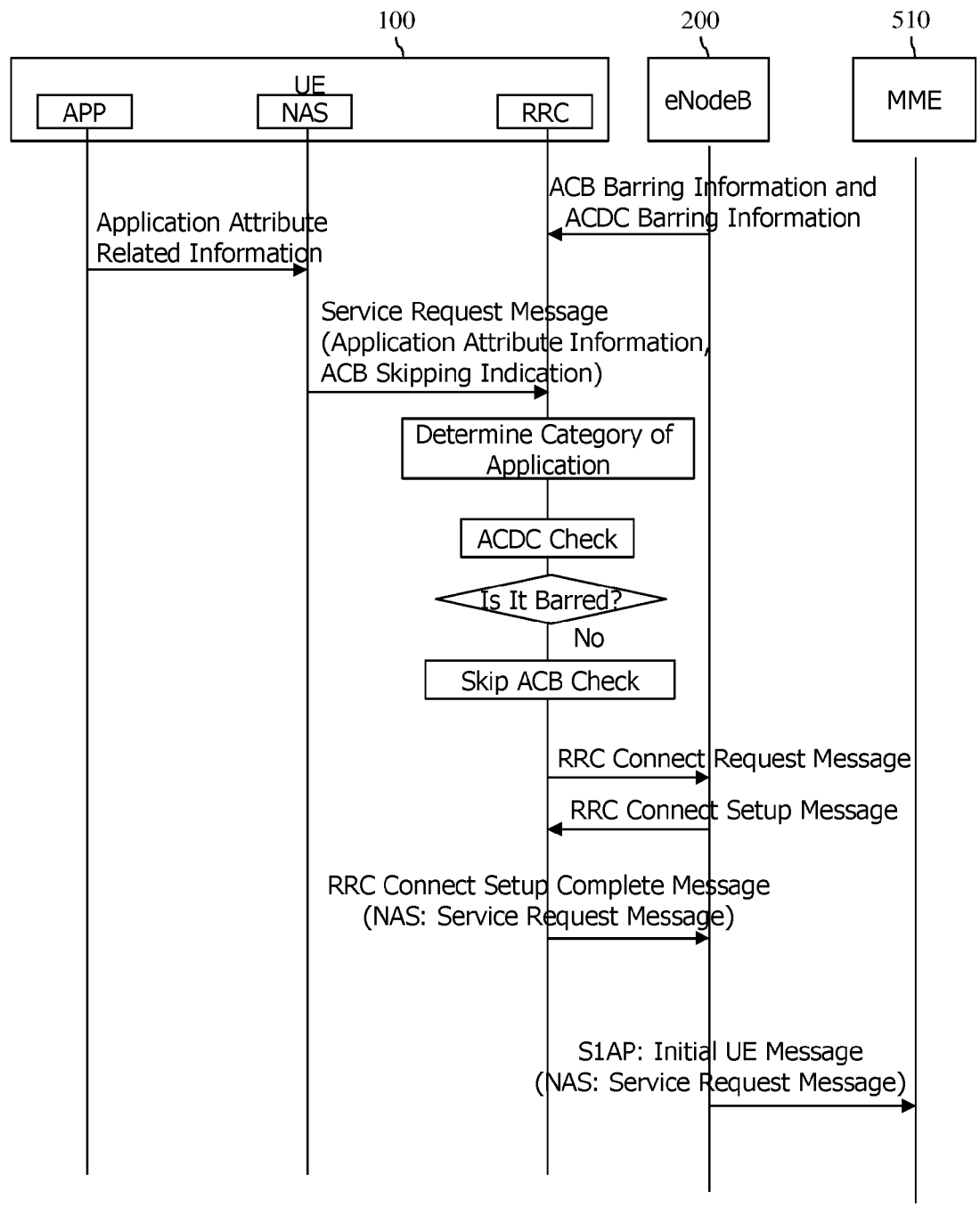
FIG. 19 and FIG. 20 illustrate an exemplary procedure according to a proposal 4 of the present specification.
Figure 20:
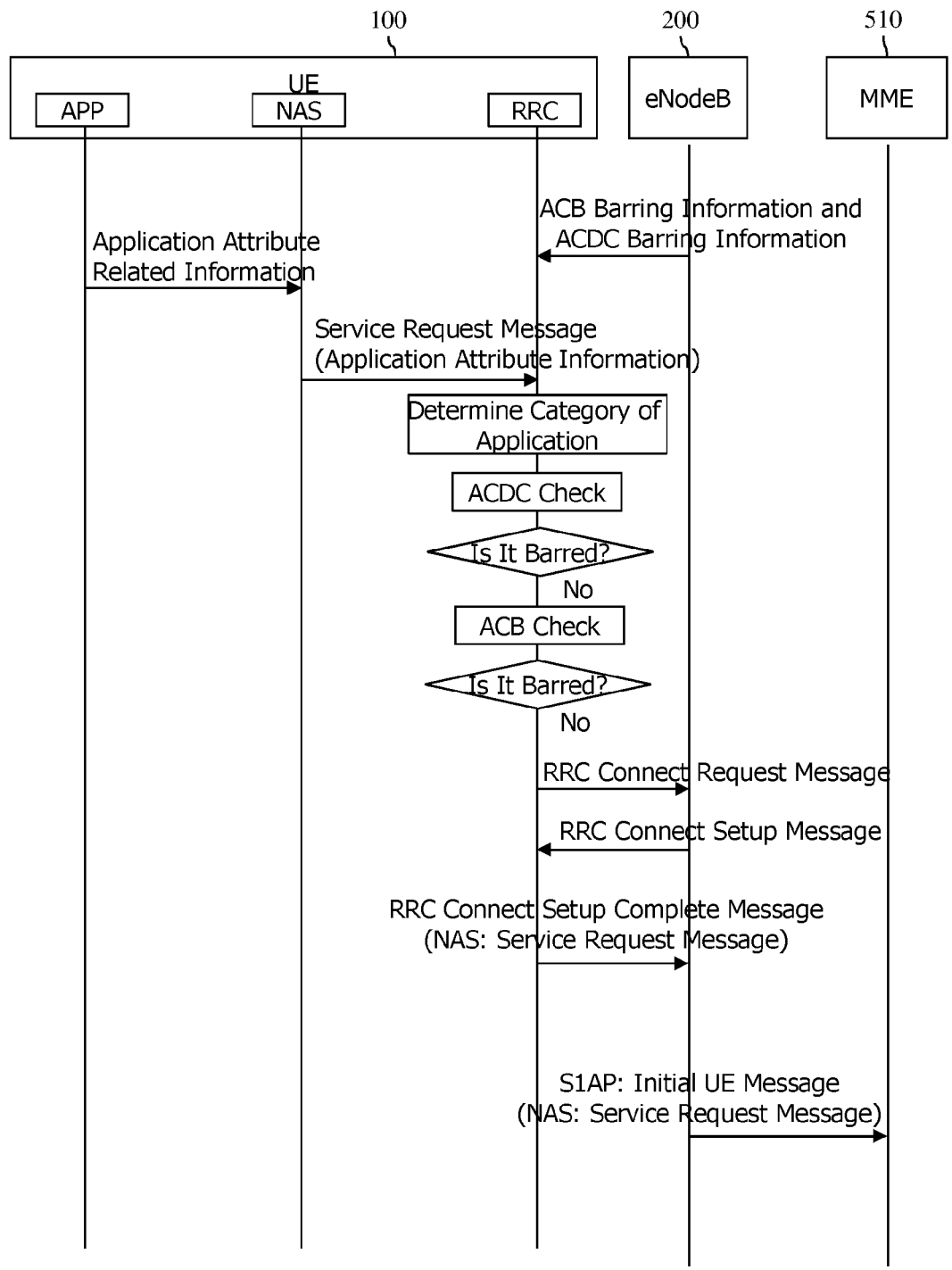

FIG. 19 and FIG. 20 illustrate an exemplary procedure according to the proposal 4 of the present specification.

(step0) Identical to the proposal 3 of the present invention.

(step1) Identical to the proposal 3 of the present invention.

(step2) When an application service start request and an application attribute related information/ID are provided from an application layer, an NAS layer performs a service request procedure or a TAU procedure. In this case, the application attribute related information provided from the application layer is delivered/provided together to an AS layer (i.e., RRC layer).

Further, service connection session setting/start indication information provided from the application layer may be provided together to the NAS layer.

(step3) When a service request procedure or a TAU procedure starts for an application service connection of the NAS layer, the AS layer (i.e., RRC layer) determines an ACDC category(s) regarding application attribute related information provided from the NAS layer on the basis of the ACDC category information obtained in the above step 0. Thereafter, an RRC connection request procedure is performed for the application service connection. In this case, if ACDC barring information provided from the network (i.e., eNodeB) and normal ACB barring information are provided simultaneously, the normal ACB barring information is not applied but overridden, and ACDC barring check is performed for the RRC connection establishment request procedure for the application service connection. In this case, the AS layer (i.e., RRC layer) performs the ACDC barring check by using only ACDC barring information for each ACDC category provided from the network (i.e., eNodeB). Upon passing the ACDC barring check, the AS layer (i.e., RRC layer) performs the RRC connection establishment request procedure. Otherwise, if an indication for skipping/overriding the normal ACB barring check is provided together to the AS layer (i.e., RRC layer) from the NAS layer, the ACB barring check is skipped/overridden and the ACDC barring check is performed for the RRC connection establishment procedure for the application service connection.

Alternatively, if the ACDC barring information of the present invention and the normal ACB barring information are provided simultaneously to the UE from the network (i.e., eNodeB) through SIB, the UE may first perform ACDC barring check in the NAS layer by applying only the ACDC barring information, and upon passing the ACDC barring check, may perform ACB barring check for applying the ACB barring information in the AS layer (i.e., RRC layer). That is, the ACDC barring check and the ACB barring check perform in an overlapping manner.

Otherwise, an access control may be performed by selectively applying the ACDC barring information and the normal ACB barring information according to an indication/configuration from the network (MME/SGSN/eNB/NB, etc.) (Any one of the ACDC barring check and the ACB barring check is performed).

Alternatively, if the AS layer additionally (or separately) receives an ACB skip indication from the NAS layer, the application service connection attempt is allowed by skipping the ACB barring check irrespective of a current access barring state. That is, even if it is in an access barring state at present, the RRC connection establishment procedure is performed by ignoring the barring state.

Meanwhile, in the aforementioned content, ACB barring check based on information of a barring ratio for each application group/category/priority information, a barring factor, an average barring time, an ACB skip configuration, or the like may imply the ACDC barring check.

Meanwhile, the proposals described above may be combined.

The contents described above may be implemented by hardware. This will be described with reference to the accompanying drawings.

Figure 21:
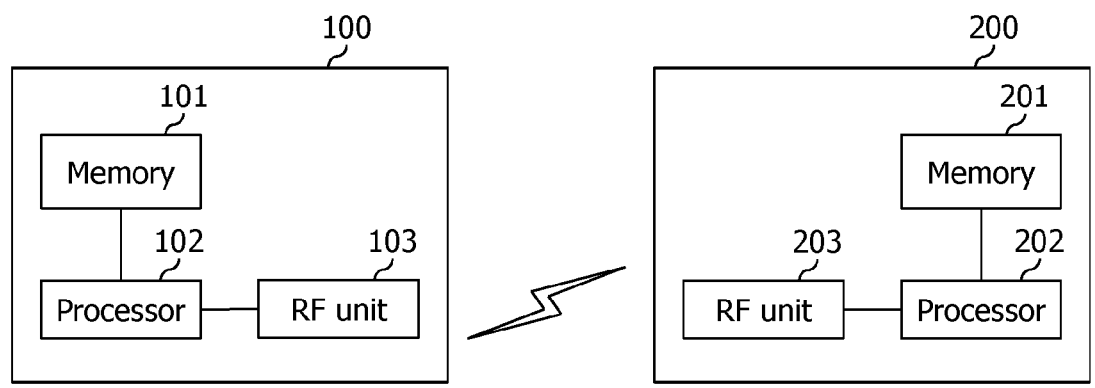
FIG. 21 is a configuration block diagram of UE 100 and a base station 200 according to the exemplary embodiment of the present invention.

FIG. 21 is a configuration block diagram of UE 100 and a base station 200 according to the exemplary embodiment of the present invention.

As illustrated in FIG. 21, the UE 100 includes a storage means 101, a controller 102, and a transceiver 103. In addition, the base station 200 includes a storage means 201, a controller 202, and a transceiver 203.

The storage means 101 and 201 store the aforementioned methods.

The controllers 102 and 202 control the storage means 101 and 201 and the transceivers 103 and 203. In detail, the controllers 102 and 202 execute the methods stored in the storage means 101 and 201, respectively. In addition, the controllers 102 and 202 transmit the aforementioned signals through the transceivers 103 and 203.

Although preferable embodiments of the present invention has been exemplarily described as above, the scope of the present invention is limited to only the specific embodiments, and as a result, various modifications, changes, or enhancements of the present invention can be made within the spirit of the present invention and the scope disclosed in the appended claims.

What is claimed is:

1. A method for barring a network access, the method performed by a user equipment (UE) and comprising:
receiving an application specific congestion control for data communication (ACDC) barring information and an access class barring (ACB) barring information; and
performing a ACDC barring check based on an ACDC category for a network access request of an application and the received ACDC barring information;
wherein although a previous network access has been barred according a previous ACB barring check, the network access request of the application is not barred according to the ACDC barring check.

2. The method of claim 1,
wherein if the network access request of the application is not barred according to the ACDC barring check, ACB barring check to be performed based on the ACB barring information is skipped based on an ACB barring check skipping indication.

3. The method of claim 1, further comprising:
although a barring timer is running since the previous network access has been barred according to the previous ACB barring check, if the network access request is not barred according to the ACDC barring check, stopping the barring timer.

4. The method of claim 1, further comprising:
indicating, by a lower layer to a higher layer, that the barred network access results from the ACB barring check; or
if the network access request is barred according to the ACDC barring check, indicating, by the lower layer to the higher layer, that the network access request is barred.

5. The method of claim 1, wherein
the ACDC category is determined based on application information.

6. The method of claim 1, wherein the application information includes at least one of:
a group, a category, a priority, information and an identifier of an application.

7. The method of claim 1, wherein the ACDC barring information includes at least on of:
a barring rate, a barring factor, a barring time, a roaming information, and an access class barring (ACB) skipping configuration, which are defined per a specific unit of an application.

8. A user equipment (UE) for barring a network access, the UE comprising:
a transceiver;
a processor configured to control the transceiver and configured to perform:
receiving an application specific congestion control for data communication (ACDC) barring information and an access class barring (ACB) barring information; and
performing a ACDC barring check based on an ACDC category for a network access request of an application and the received ACDC barring information;
wherein although a previous network access has been barred according a previous ACB barring check, the network access request of the application is not barred according to the ACDC barring check.

9. The UE of claim 8, wherein if the network access request is not barred according to the ACDC barring check, an ACB barring check to be performed based on the ACB barring information is skipped based on an ACB barring check skipping indication.

10. The UE of claim 8, wherein the process is further configured to perform:
although a barring timer is running since the previous network access has been barred according to the previous ACB barring check, if the network access by the executed application is not barred according to the ACDC barring check, stopping the barring timer.

11. The UE of claim 8, wherein the process is further configured to perform:
indicating, by a lower layer to a higher layer, that the barred network access results from the ACB barring check.

12. The UE of claim 8, wherein
the ACDC category is determined based on application information.

* * * * *